US012725342B2

(12) United States Patent
Moon et al.

(10) Patent No.: US 12,725,342 B2
(45) Date of Patent: Sep. 1, 2026

(54) DEVICE AND METHOD FOR GENERATING EMOTION COMBINED CONTENT

(71) Applicant: SAMSUNG ELECTRONICS CO., LTD., Suwon-si (KR)

(72) Inventors: Minjeong Moon, Suwon-si (KR); Woonghee Park, Suwon-si (KR); Giyong Lee, Suwon-si (KR); Minjung Moon, Suwon-si (KR); Chunbae Park, Suwon-si (KR); Dami Jeon, Suwon-si (KR); Hayoung Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 169 days.

(21) Appl. No.: 18/830,295

(22) Filed: Sep. 10, 2024

(65) Prior Publication Data

US 2025/0005832 A1 Jan. 2, 2025

Related U.S. Application Data

(63) Continuation of application No. 17/877,456, filed on Jul. 29, 2022, now Pat. No. 12,112,413, which is a (Continued)

(30) Foreign Application Priority Data

Aug. 26, 2021 (KR) ........................ 10-2021-0113039
Nov. 11, 2021 (KR) ........................ 10-2021-0155060

(51) Int. Cl.

*G06T 11/00* (2026.01)
*G06T 11/60* (2006.01)
*G06T 13/80* (2011.01)

(52) U.S. Cl.

CPC .............. *G06T 11/60* (2013.01); *G06T 13/80* (2013.01)

(58) Field of Classification Search

None
See application file for complete search history.

(56) References Cited

U.S. PATENT DOCUMENTS 8,171,084 B2 * 5/2012 Walter .................... H04L 51/04 709/204
9,244,907 B2 1/2016 Leydon
(Continued)

FOREIGN PATENT DOCUMENTS

CN 106033337 A 10/2016
KR 10-2010-0125994 A 12/2010
(Continued)

OTHER PUBLICATIONS

Communication dated Jan. 23, 2026 issued by the European Patent Office in European Patent Application No. 25208243.3.
(Continued)

*Primary Examiner* — Martin Mushambo
(74) *Attorney, Agent, or Firm* — Sughrue Mion, PLLC

(57) ABSTRACT

An electronic device includes an input module configured to receive, from a user, an input of a plurality of emotion representation contents representing emotions, a display, and a processor electrically connected to the input module and the display. The processor is configured to, in response to at least one emotion representation content among the plurality of emotion representation contents being different from other emotion representation contents among the plurality of emotion representation contents, present a recommended animation representation based on an emotion combination of the plurality of emotion representation contents.

20 Claims, 21 Drawing Sheets

Related U.S. Application Data continuation of application No. PCT/KR2022/007474, filed on May 26, 2022.

(56) References Cited

U.S. PATENT DOCUMENTS

| | | | | |
|---|---|---|---|---|
| 10,515,464 | B2 | 12/2019 | Stukalov | |
| 11,159,458 | B1 * | 10/2021 | Johnson | H04L 51/10 |
| 2005/0156873 | A1 * | 7/2005 | Walter | H04L 51/04 345/156 |
| 2007/0112916 | A1 * | 5/2007 | Singh | H04L 41/5093 709/206 |
| 2010/0123724 | A1 * | 5/2010 | Moore | G06F 3/0219 345/173 |
| 2010/0302254 | A1 * | 12/2010 | Min | G06F 40/109 345/473 |
| 2015/0347384 | A1 | 12/2015 | Leydon | |
| 2016/0180572 | A1 * | 6/2016 | Houjou | H04N 1/32144 345/473 |
| 2017/0075878 | A1 * | 3/2017 | Jon | H04M 1/72436 |
| 2017/0308742 | A1 * | 10/2017 | Yao | G06V 40/16 |
| 2017/0344224 | A1 * | 11/2017 | Kay | G06F 3/0482 |
| 2017/0353405 | A1 * | 12/2017 | O'Driscoll | H04L 51/046 |
| 2018/0167347 | A1 * | 6/2018 | Patierno | H04L 51/10 |
| 2018/0190263 | A1 * | 7/2018 | Calef, III | G10L 13/04 |
| 2019/0073801 | A1 * | 3/2019 | Stukalov | G06T 11/10 |
| 2019/0122403 | A1 * | 4/2019 | Woo | G06N 20/00 |
| 2019/0122412 | A1 * | 4/2019 | Woo | G06F 40/284 |
| 2019/0204868 | A1 * | 7/2019 | Choi | G06F 3/04845 |
| 2019/0228552 | A1 | 7/2019 | Lee et al. | |
| 2020/0110794 | A1 * | 4/2020 | Vos | G06F 40/279 |
| 2020/0219295 | A1 | 7/2020 | El Kaliouby et al. | |
| 2020/0296147 | A1 * | 9/2020 | Eliason | H04L 65/403 |
| 2020/0328994 | A1 * | 10/2020 | Ham | H04L 51/48 |
| 2020/0380199 | A1 * | 12/2020 | Judovsky | G06F 40/134 |
| 2022/0070125 | A1 * | 3/2022 | Vasamsetti | H04L 51/063 |
| 2022/0215169 | A1 * | 7/2022 | Edwards | G06N 20/00 |
| 2022/0343569 | A1 * | 10/2022 | Karri | G06F 40/284 |
| 2022/0392135 | A1 * | 12/2022 | Cundall | H04L 51/10 |
| 2022/0394001 | A1 * | 12/2022 | Cundall | H04M 1/7243 |

FOREIGN PATENT DOCUMENTS

| | | | |
|---|---|---|---|
| KR | 10-2013-0025277 | A | 3/2013 |
| KR | 10-1633212 | B1 | 6/2016 |
| KR | 10-1757184 | B1 | 7/2017 |
| KR | 10-2078209 | B1 | 2/2020 |
| KR | 10-2020-0032389 | A | 3/2020 |
| KR | 10-2020-0095762 | A | 8/2020 |
| KR | 10-2188739 | B1 | 12/2020 |
| KR | 10-2021-0079682 | A | 6/2021 |

OTHER PUBLICATIONS

Office Action dated Jul. 29, 2025 , issued by Indian Patent Office in Indian Patent Application No. 202347077845.

Extended European Search Report dated Jul. 31, 2024, issued by the European Patent Office in European Application No. 22861512.6.

Communication dated Sep. 1, 2022, issued by the International Searching Authority in counterpart International Application No. PCT/KR2022/007474 (PCT/ISA/210).

* cited by examiner

DEVICE AND METHOD FOR GENERATING EMOTION COMBINED CONTENT

CROSS-REFERENCE TO RELATED APPLICATIONS

This application is a Continuation of U.S. patent application Ser. No. 17/877,456, filed Jul. 29, 2022, in the US Patent and Trademark Office, which is a bypass Continuation of International Application No. PCT/KR2022/007474 designating the United States, filed on May 26, 2022, in the Korean Intellectual Property Receiving Office and claiming priority to Korean Patent Application No. 10-2021-0113039, filed on Aug. 26, 2021, and Korean Patent Application No. 10-2021-0155060, filed on Nov. 11, 2021, in the Korean Intellectual Property Office, the disclosures of which are incorporated by reference herein in their entireties.

BACKGROUND

1. Field

The disclosure relates generally to a generation of emotion combined content.

2. Description of Related Art

A social network service (SNS) application provides some functions of generating content for expressing emotions to users. Functions of generating content for expressing emotions and content sharing are limited. In addition, although human emotions are complex, emojis or stickers used in the SNS may generally represent a single emotion.

SUMMARY

Provided is an electronic device that may generate content representing various complex human emotions and provide the content.

According to an aspect of an example embodiment, an electronic device may include an input module configured to receive, from a user, an input of a plurality of emotion representation contents representing emotions, a display, and a processor electrically connected to the input module and the display. The processor may be configured to, in response to at least one emotion representation content among the plurality of emotion representation contents being different from other emotion representation contents among the plurality of emotion representation contents, present a recommended animation representation based on an emotion combination of the plurality of emotion representation contents.

According to an aspect of an example embodiment, a method implemented by a processor may include receiving, from a user, an input of a plurality of emotion representation contents representing emotions, in response to at least one emotion representation content among the plurality of emotion representation contents being different from other emotion representation contents, presenting a recommended animation representation based on an emotion combination of the plurality of emotion representation contents, and generating emotion combined content by applying an animation representation selected by the user among animation representations comprising the recommended animation representation to the plurality of emotion representation contents.

According to an aspect of an example embodiment, a non-transitory computer-readable storage medium may store instructions that, when executed by a processor, cause the processor to receive, from a user, an input of a plurality of emotion representation contents representing emotions, in response to at least one emotion representation content among the plurality of emotion representation contents being different from other emotion representation contents, present a recommended animation representation based on an emotion combination of the plurality of emotion representation contents, and generate emotion combined content by applying an animation representation selected by the user among animation representations comprising the recommended animation representation to the plurality of emotion representation contents.

Additional aspects will be set forth in part in the description which follows and, in part, will be apparent from the description, or may be learned by practice of the presented embodiments.

According to an example embodiment, an electronic device may apply and combine various dynamic visual effects by selecting two or more emotion representation contents, to convert and transmit emotion combined content (e.g., graphics interchange format (GIF) content) in real time.

According to an example embodiment, an electronic device may recommend emotion combined content by reflecting an animation representation determined according to a combination based on an emotion category, a priority, and a number of selected emotion representation contents.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
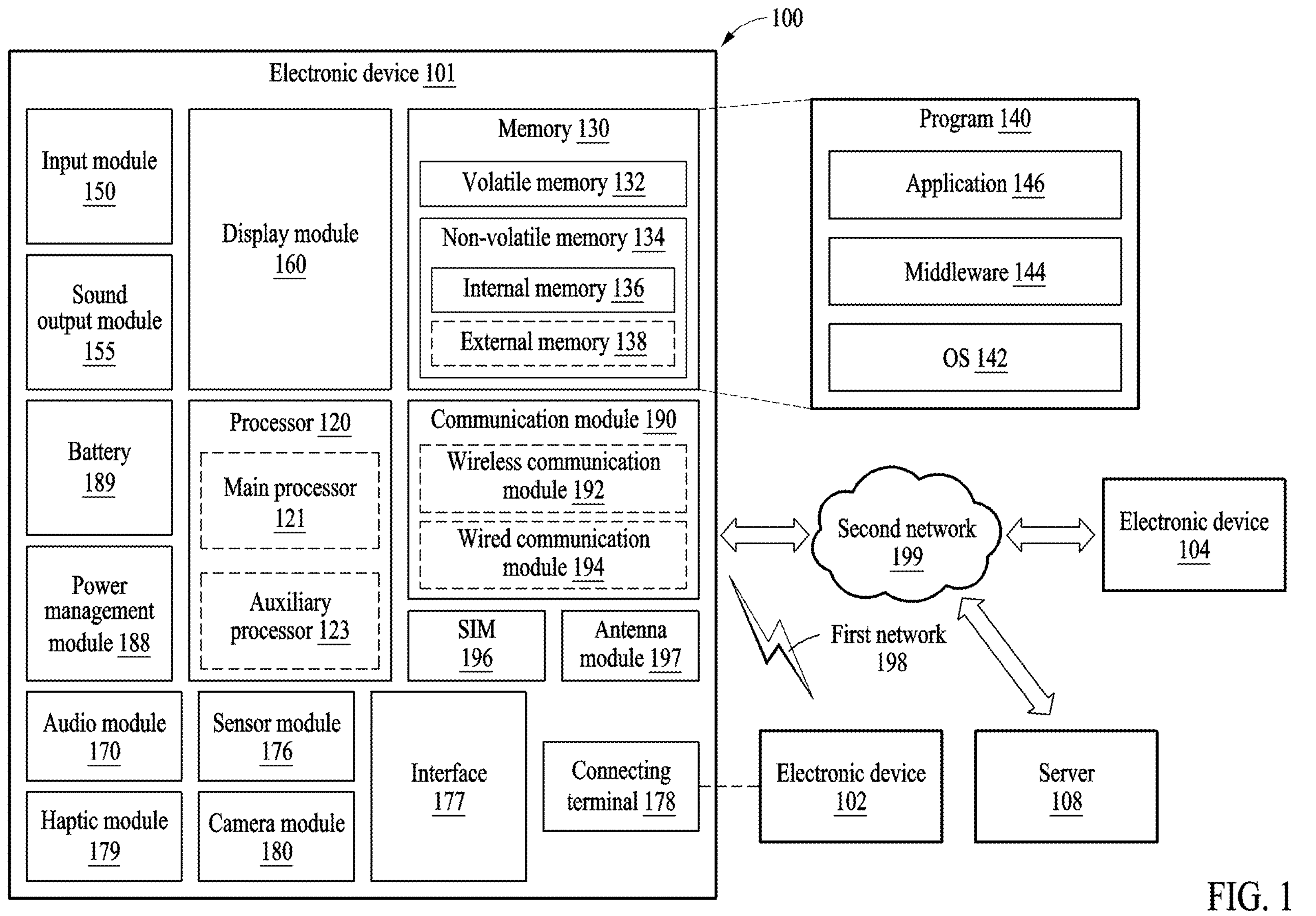
FIG. 1 is a block diagram illustrating an electronic device in a network environment according to an example embodiment.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to an example embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
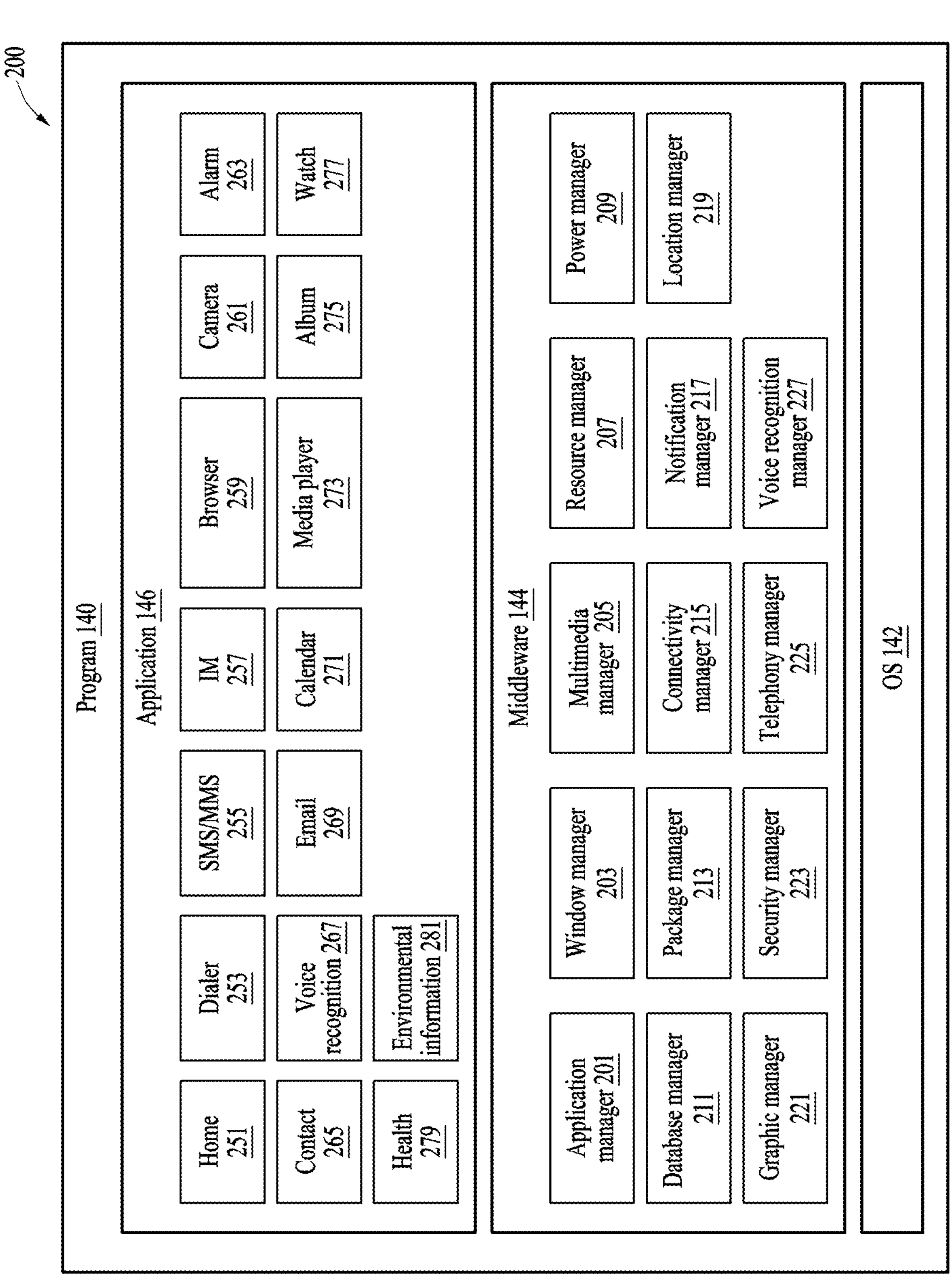
FIG. 2 is a block diagram illustrating a program according to an example embodiment.

FIG. 2 is a block diagram 200 illustrating a program 140 according to an example embodiment. According to an example embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an example embodiment, the middleware 144 may dynamically delete some existing components or add new components. According to an example embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, deletion, or update of an application that operates in an external electronic device.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 3:
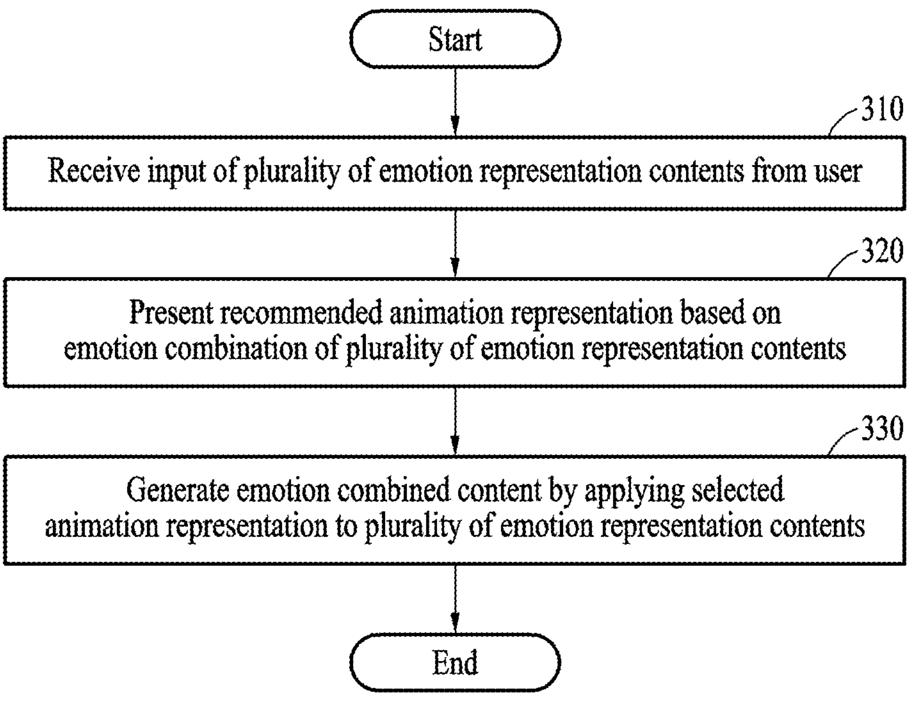
FIG. 3 is a flowchart illustrating a generation of emotion combined content according to an example embodiment.

FIG. 3 is a flowchart illustrating a generation of emotion combined content according to an example embodiment.

In operation 310, an input module (e.g., the input module 150 of FIG. 1) of an electronic device (e.g., the electronic device 101 of FIG. 1) may receive an input of a plurality of emotion representation contents that represent emotions from a user. Emotion representation content may be a visual representation to represent an emotion, and may represent one of a positive emotion, a negative emotion, and a neutral emotion. For example, the emotion representation content may include one of an emoji, an emoticon, and a sticker that represents emotions, or a combination of two or more thereof. The electronic device may directly receive an input (e.g., an input of a Unicode indicating an emoji) indicating emotion representation content from a user, or may extract emotion representation content from a user input (e.g., an input of a character string). For example, the electronic device may receive an input of a plurality of emotion representation contents that each represent one of a positive emotion, a negative emotion, and a neutral emotion from a user. In the present disclosure, for example, a positive emotion among emotions represented in emotion representation content may include emotion categories of smile, love, and fun. A negative emotion may include emotion categories of skeptical, sleepy, unwell, concern, and negative. A neutral emotion may include a neutral emotion category.

In operation 320, a processor (e.g., the processor 120 of FIG. 1) of the electronic device may present a recommended animation representation based on an emotion combination of a plurality of emotion representation contents. For example, if at least one emotion representation content among the plurality of emotion representation contents is different from the other emotion representation contents, the electronic device may present a recommended animation representation based on an emotion combination of a plurality of emotion representation contents. The emotion combination may be a combination of emotions indicated by the emotion representation contents, and may include, for example, one of a combination of positive emotions, a combination of negative emotions, a combination of one or more positive emotions and one or more negative emotions, and a combination including at least one neutral emotion. For example, the electronic device may identify the emotion combination of the plurality of emotion representation contents as one of a positive emotion, a negative emotion, and a neutral emotion, or a combination of two or more thereof, and may present a recommended animation representation corresponding to the identified emotion combination.

Subsequently, in operation 330, the processor of the electronic device may generate emotion combined content by applying an animation representation selected by the user from among animation representations including the recommended animation representation to the plurality of emotion representation contents. An animation representation may be generated by applying a visual movement, a change, a size adjustment (e.g., enlargement and reduction), and a rotating motion to emotion representation content, and may include one or a combination of two or more of the above-described motions. The emotion combined content may represent result content obtained by applying a selected animation representation to a plurality of emotion representation contents.

For example, the electronic device may output a preview representation generated by applying the recommended animation representation presented in operation 320 to the plurality of emotion representation contents and performing rendering. In response to the preview representation to which the recommended animation representation is applied being selected, the electronic device may generate the emotion combined content by encoding content in which the recommended animation representation is applied to the plurality of emotion representation contents. In another example, the electronic device may output a plurality of preview representations by applying a plurality of recommended animations to the plurality of emotion representation contents and performing rendering. The electronic device may generate emotion combined content by encoding content to which an animation effect corresponding to a preview representation selected from among the plurality of preview representations is applied. In another example, in response to an animation representation different from the presented animation representation being selected, the electronic device may generate the emotion combined content by encoding content to which another selected animation effect is applied.

Figure 4:
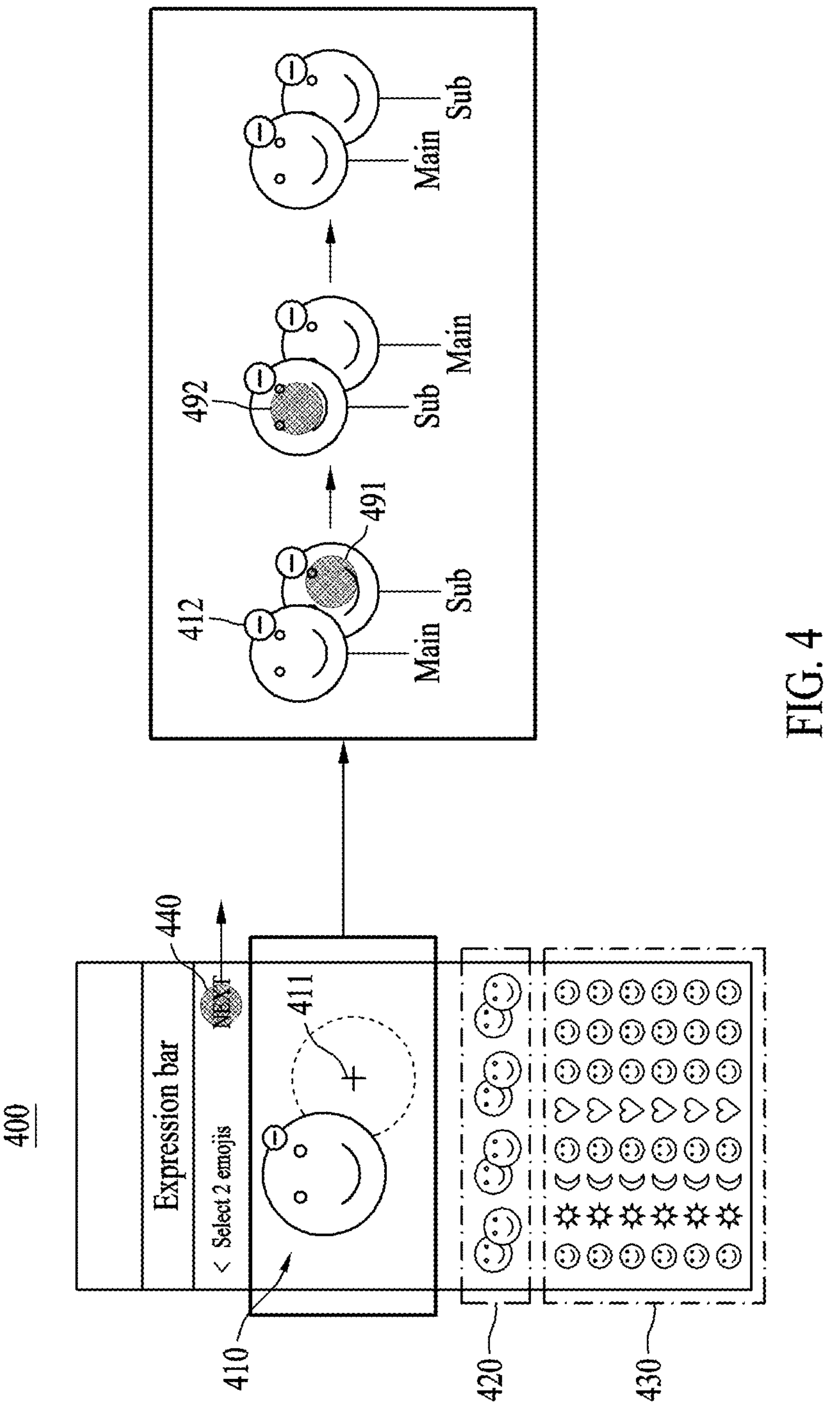
FIG. 4 is a diagram of a content generation interface according to an example embodiment.

FIG. 4 is a diagram of a content generation interface according to an example embodiment.

An electronic device (e.g., the electronic device 101 of FIG. 1) may select a portion of emotion representation contents provided through a content generation interface 400, in response to an input through an input module (e.g., the input module 150 of FIG. 1). The content generation interface 400 may be an interface to generate emotion combined content, and may include, for example, an interface to select emotion representation content to be combined, and an interface to select an animation representation applied to a plurality of selected emotion representation contents.

The content generation interface 400 may include a preview area 410, a combination candidate panel 420, and an emotion representation content area 430.

Figure 18:
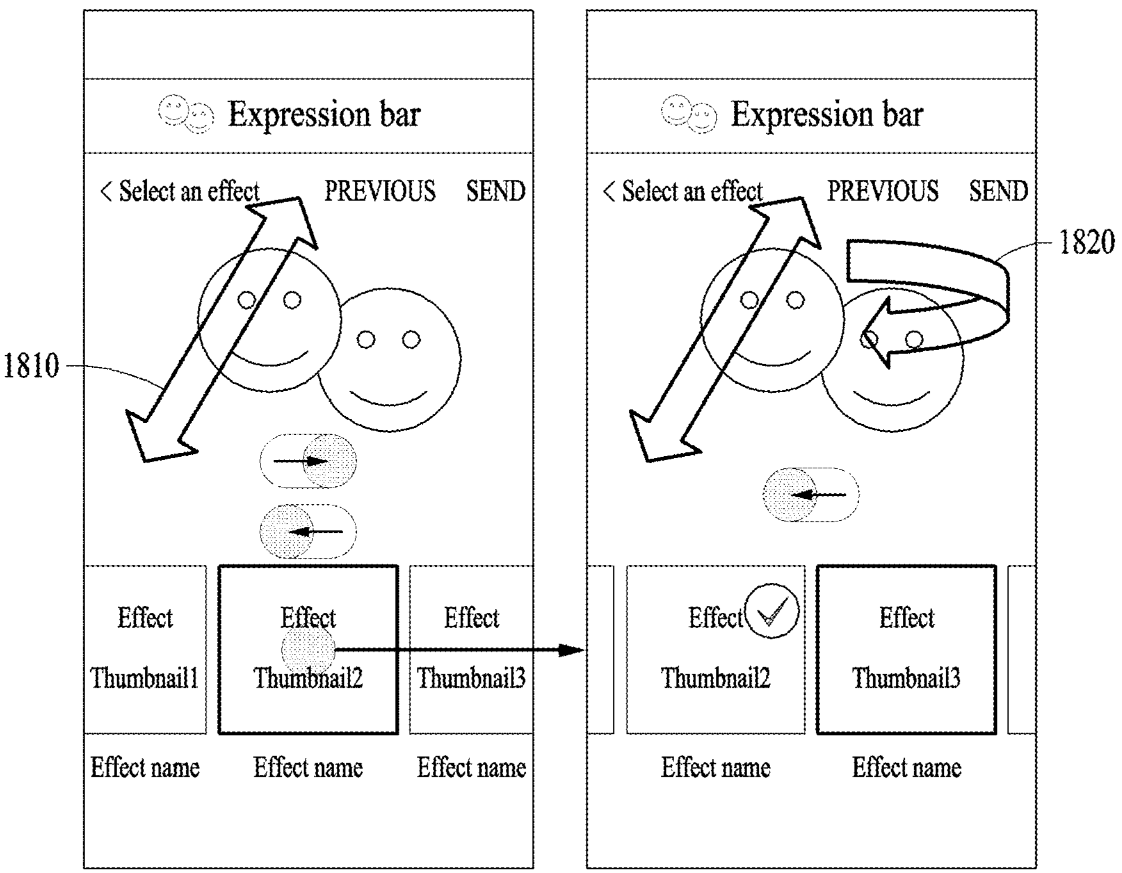
FIG. 18 is a diagram of an interface for applying a plurality of animation effects according to an example embodiment.

In the preview area 410, selected emotion representation content may be output. For example, when entering the content generation interface 400, the electronic device may provide default content in the preview area 410. When a content deletion input 412 is received from a user, the electronic device may exclude pre-selected emotion combined content from the preview area 410. A number of contents selectable from the content generation interface 400 may be limited, and an example in which the number of contents to be selected is limited two is shown in FIG. 4. The content generation interface 400 may provide an empty image 411 indicating a possibility of content being selected in the preview area 410. The electronic device may guide a user that a number of contents to be combined corresponding to a number of empty images 411 may be added. However, there is no limitation thereto, and an example of an interface that enables three or more contents to be selected is illustrated in FIG. 18, which will be described below.

The electronic device may select main content from among the plurality of emotion representation contents selected in the preview area 410. The electronic device may determine non-selected content as sub-content. The electronic device may set emotion representation content designated by a user among the plurality of emotion representation contents selected by the user as the main content and may set the other emotion representation contents as sub-contents in the content generation interface 400. The electronic device may preferentially visualize the main content over the sub-content. For example, when a portion of the main content and the sub-content spatially overlap and/or collide on a screen, the electronic device may preferentially display a portion corresponding to the main content and cover the sub-content. In other words, the electronic device may overlay and display the main content on the sub-content. For example, the electronic device may display emotion representation content selected as main content in an upper position and may display the sub-content in a lower position. The upper position may indicate a layer in which content is drawn preferentially over the other contents, and the lower position may indicate a layer in which content is drawn with a lower priority.

The electronic device may switch between main content and sub-content in response to a user input. For example, in the preview area 410, first content may be output as main content and second content may be output as sub-content. The electronic device may determine the second content as the main content in response to an input 491 (e.g., an input to tap the screen) to select the second content. As illustrated in FIG. 4, the second content that is covered by the first content may be displayed over the first content. When the first content is selected again by an additional input 492, the electronic device may display the first content in the upper position again.

The electronic device may output a recommended animation representation determined based on an emotion combination of a plurality of emotion representation contents to an area (e.g., a preview area) on which a user's attention is focused. The electronic device may visualize a preview representation generated by applying the recommended animation representation to the plurality of emotion representation contents. The visualizing of the preview representation will be described below with reference to FIG. 11.

The combination candidate panel 420 may indicate a candidate combination for selected emotion combined contents. For example, the electronic device may provide a preset combination of currently selected emotion representation content and another content that is recommended in the combination candidate panel 420. In another example, the electronic device may provide a combination history (e.g., a recent combination history) of the currently selected emotion representation content and another emotion representation content that is recently used, in the combination candidate panel 420. Although four candidate combinations are provided as shown in FIG. 4, the example embodiments are not limited thereto. For reference, in response to a selection completion input 440, the electronic device may enter an animation selection interface that will be described below with reference to FIG. 11. When the selection completion input 440 is received, the electronic device may update the most recently used emotion representation combination among candidate combinations.

The emotion representation content area 430 may include emotion representation contents selectable in the content generation interface 400.

For reference, as described above, the electronic device may classify a plurality of emotion representation contents as main content and sub-content. The electronic device may apply a partial motion corresponding to the main content in a selected animation representation to the main content. The electronic device may apply a partial motion corresponding to the sub-content in the selected animation representation to the sub-content. For example, as described above, an animation representation may include a combination of a plurality of motions. The electronic device may apply a motion applied only to main content to the main content, and may apply a motion applied only to sub-content to the sub-content. For example, the electronic device may apply a fade-out motion (e.g., a motion that gradually becomes transparent and disappears) to the main content and apply a fade-in motion (e.g., a motion that gradually becomes opaque and appears) to the sub-content. Application examples of various motions will be described with reference to FIGS. 8 through 10 below.

For reference, although an example in which the main content and the sub-content are selected from the plurality of emotion representation contents by a user's explicit input has been described above with reference to FIG. 4, the example embodiments are not limited thereto. In addition, the main content and the sub-content may be selected based on information extracted from a user input (e.g., a frequency of appearance of emotions), which will be described below with reference to FIG. 5.

Figure 5:
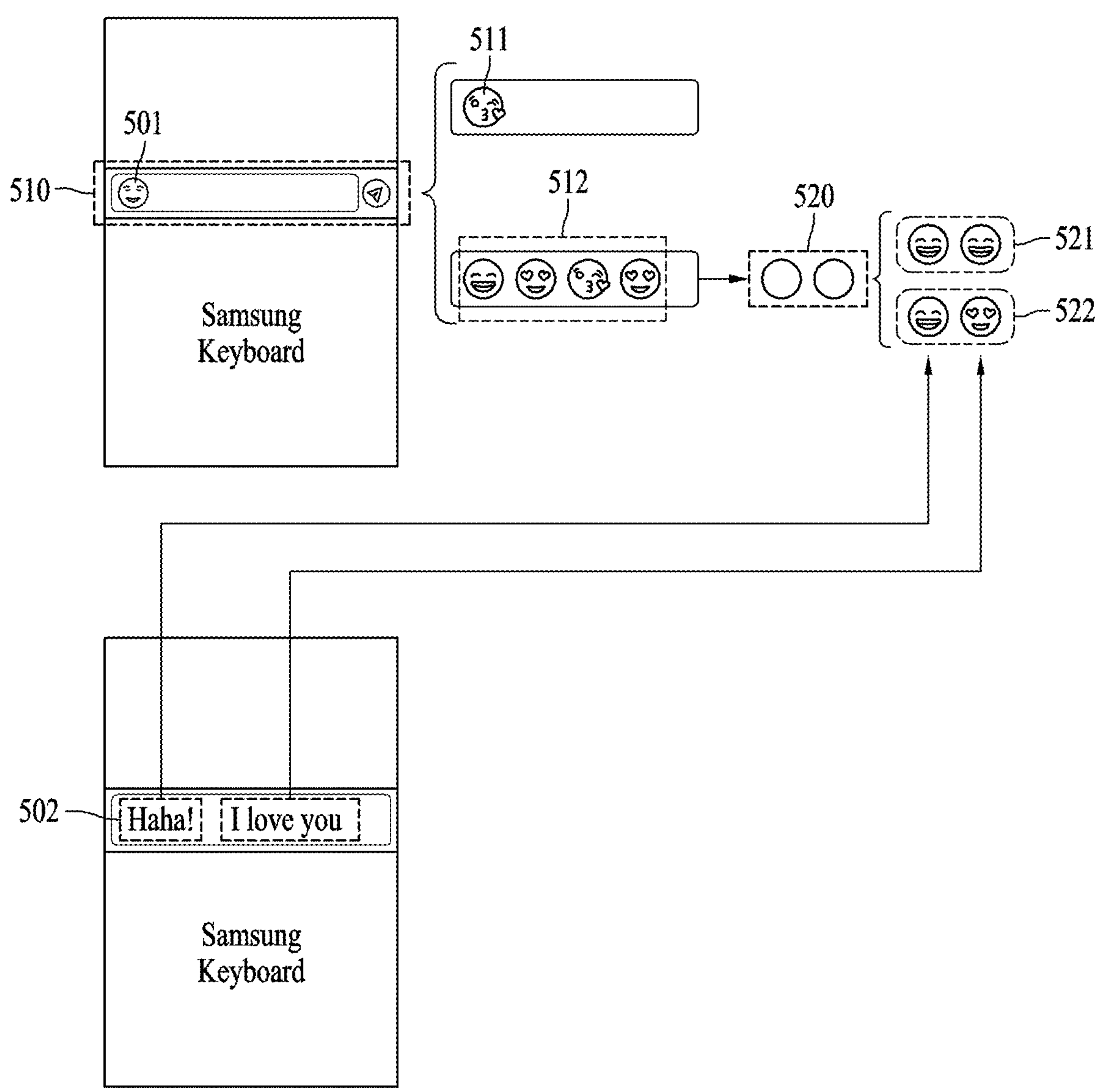
FIG. 5 is a diagram of an extraction of emotion representation content through an input window according to an example embodiment.

FIG. 5 is a diagram of an extraction of emotion representation content through an input window according to an example embodiment.

A processor (e.g., the processor 120 of FIG. 1) of an electronic device (e.g., the electronic device 101 of FIG. 1) according to various example embodiments may determine a plurality of content representing contents to be used to generate emotion combined content from a series of user inputs received through an application (e.g., a keyboard application). In an example, the electronic device may receive an input 501 (e.g., a Unicode input indicating an emoji) indicating emotion representation content through the input window 510. In another example, the electronic device may receive a character string 502 through the input window 510 and may also extract emotion representation content from the received character string 502 through an emotion analysis. The electronic device may operate differently based on the case of receiving a single emotion representation 511 and the case of receiving a plurality of emotion representations 512.

For example, when the plurality of emotion representations 512 are extracted, the electronic device may determine emotion representation contents corresponding to a limited number 520 (e.g., two) of the plurality of emotion representations 512. The electronic device may determine a plurality of emotion representation contents based on a number of emotion representations identified from a series of user input received through an input module (e.g., the input module 150 of FIG. 1). The electronic device may determine a plurality of emotion representation contents corresponding to a user input based on an emotion input frequency and an input order. An input frequency of one emotion representation may be, for example, a number of corresponding emotion representations extracted from a series of inputs input by a user in one input window 510. An input order of one emotion representation may be, for example, an order in which a corresponding emotion representation is input among a series of inputs input by the user in one input window 510. The electronic device may extract a limited number 520 (e.g., top two) of emotion representation contents in a descending order of input frequencies among emotion representations extracted from a series of user inputs. In other words, when three or more emotion representations have the same input frequency, the electronic device may preferentially select emotion representation content corresponding to an emotion representation that is inputted firstly.

The electronic device may classify the plurality of emotion representation contents determined from a series of user inputs as main content and sub-content based on the input frequency and the input order. For example, the electronic device may determine, as the main content, content with a high input frequency among the same number of extracted emotion representation contents as the limited number 520. When input frequencies of the extracted emotion representation contents are identical to each other, the electronic device may determine emotion representation content, which is inputted firstly, as the main content.

For example, in response to an emotion combination 522 in which at least one emotion representation content among the plurality of extracted emotion representation contents is different from the other emotion representation contents, the electronic device may determine a first recommended animation representation among a plurality of animation representations based on an emotion combination and an emotion weight that will be described below with reference to FIGS. 6 and 7. In addition, when the plurality of extracted emotion representation contents match recent combination history and one of candidate combinations of a preset combination, the electronic device may determine an animation representation applied to the matched combination as a second recommended animation representation. The recent combination history may be a history of combining emotion representation contents by a user, and the preset combination may indicate a list of combinations of emotion representation contents set by a user. The electronic device may determine an animation representation applied most frequently in the recent combination history as a third recommended animation representation. The electronic device may randomly determine one of the plurality of animation representations as a fourth recommended animation representation. The electronic device may randomly select a fourth recommended animation representation from among animation representations other than the first recommended animation representation, the second recommended animation representation, and the third recommended animation representation among the plurality of animation representations. The electronic device may individually output, to a preview area, a first preview representation generated by applying the first recommended animation representation to the plurality of emotion representation contents, a second preview representation generated by applying the second recommended animation representation, a third preview representation generated by applying the third recommended animation representation, and a fourth preview representation generated by applying the fourth recommended animation representation, which will be described below with reference to FIG. 11.

For reference, when the second recommended animation representation is the same as the first recommended animation representation, the electronic device may exclude the second recommended animation representation. Similarly, when the third recommended animation representation is the same as at least one of the first recommended animation representation and the second recommended animation representation, the electronic device may exclude the third recommended animation representation. When the fourth recommended animation representation is the same as at least one of the first recommended animation representation, the second recommended animation representation, and the third recommended animation representation, the electronic device may exclude the fourth recommended animation representation.

In addition, the electronic device may separate emotion sequences based on a delimiter (e.g., a space, a line break, and a special symbol) within one input window 510. When one emotion sequence shows the same emotion representation, the electronic device may extract a plurality of emotion representation contents 521 identical to each other from the emotion sequence. When a combination matching a plurality of emotion representation contents 521 that are extracted and that are identical to each other is retrieved from a recent combination history and a preset combination, the electronic device may determine an animation representation applied to the matched combination as the first recommended animation representation. The electronic device may determine the second recommended animation representation from among animation representations (e.g., an animation representation designated for the same emotion combination by a service provider) pre-selected for the same emotion combination in the plurality of animation representations. The electronic device may individually output, to the preview area, the first preview representation generated by applying the first recommended animation representation to the plurality of emotion representation contents and the second preview representation generated by applying the second recommended animation representation.

The example in which the plurality of emotion representation contents are extracted has been described above, however, the example embodiments are not limited thereto. For example, the electronic device may also extract a single emotion representation content from the input window 510. The electronic device may retrieve matching content from a recent combination history and a preset combination for the extracted single emotion representation content. When the matching content is retrieved, the electronic device may determine an animation representation applied to corresponding content as the first recommended animation representation. The electronic device may determine the second recommended animation representation from among animation representations pre-selected for the single emotion representation 511 in the plurality of animation representations. The electronic device may individually output, to the preview area, the first preview representation generated by applying the first recommended animation representation to the plurality of emotion representation contents and the second preview representation generated by applying the second recommended animation representation.

For reference, as described above, the electronic device may exclude overlapping animation representations while determining recommended animation representations based on various criteria. If the same animation representation in which main content and sub-content are separated is recommended based on different criteria, and if designation of the main content and the sub-content in a corresponding recommendation is the same, a recommendation based on criteria other than one criterion among the criteria may be excluded as an overlapping animation representation. If an animation representation in which main content and sub-content are not separated is recommended based on different criteria, and if a plurality of emotion representation contents extracted from a corresponding recommendation are the same, a recommendation based on criteria other than one criterion among the criteria may be excluded as an overlapping animation representation. Furthermore, the above-described order of operations of determining a recommended animation representation are not limited, and there is no need to perform all operations. For example, when separation of main content and sub-content is not required in a recommended animation representation determined for a plurality of extracted emotion representation contents, the electronic device may skip classification of the plurality of emotion representation contents as main content and sub-content.

When a preview representation visualized in a recommendation area is selected, the electronic device according to an example embodiment may share emotion combined content encoded corresponding to the preview representation with at least one of other applications and other electronic devices. The electronic device may present a plurality of preview representations in the preview area, and generate emotion combined content by encoding the plurality of emotion representation contents to a recommended animation representation corresponding to a preview representation selected by a user, which will be described below with reference to FIG. 11.

Figure 6:
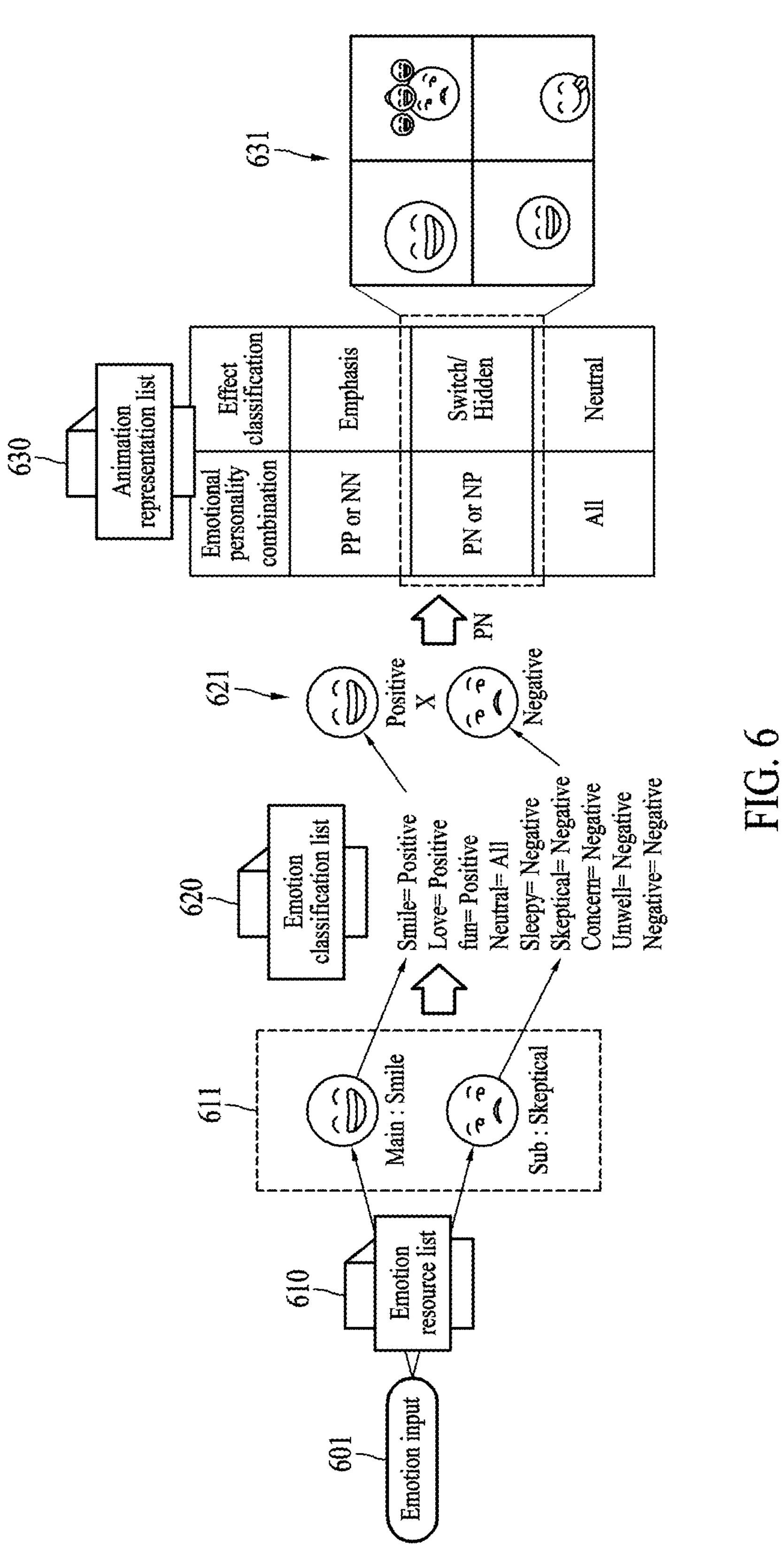
FIG. 6 is a diagram of an identification of emotion combinations and a selection of a recommended animation effect according to an example embodiment.

FIG. 6 is a diagram of an identification of emotion combinations and a selection of a recommended animation effect according to an example embodiment.

According to an example embodiment, an electronic device (e.g., the electronic device 101 of FIG. 1) may extract emotion representation contents 611 from a series of user inputs (e.g., an emotion input 601) as described above with reference to FIG. 5. For example, the electronic device may identify matching emotion representation contents 611 from an emotion resource list 610 in response to the emotion input 601. The emotion resource list 610 may include emotion representation content, and emotion categories (e.g., smile, love, fun, skepticism, sleepiness, pain, worry, negation, and neutral) corresponding to each emotion representation content. In an example shown in FIG. 6, the electronic device may extract a smile emoji and a skeptical emoji as main content and sub-content, respectively.

The electronic device may determine an emotion representation (e.g., a positive emotion, a negative emotion, and a neutral emotion) corresponding to an emotion category identified based on an emotion classification list 620. For example, in the example of FIG. 6, the electronic device may determine a positive emotion for the smile emoji and determine a negative emotion for the skeptical emoji. The electronic device may identify an emotion combination 621 (e.g., PN) in which the main content represents a positive emotion and the sub-content represents a negative emotion.

The electronic device may determine a recommended animation representation 631 from an animation representation list 630 including a plurality of animation representations based on the emotion combination 621 of the plurality of emotion representation contents. When a plurality of animation representations corresponding to the identified emotion combination 621 are included in the animation representation list 630, the electronic device may present the plurality of animation representations as the recommended animation representation 631. However, the example embodiments are not limited thereto, and the electronic device may select one animation representation from among the plurality of animation representations and present the selected animation representation as the recommended animation representation 631.

Figure 7:
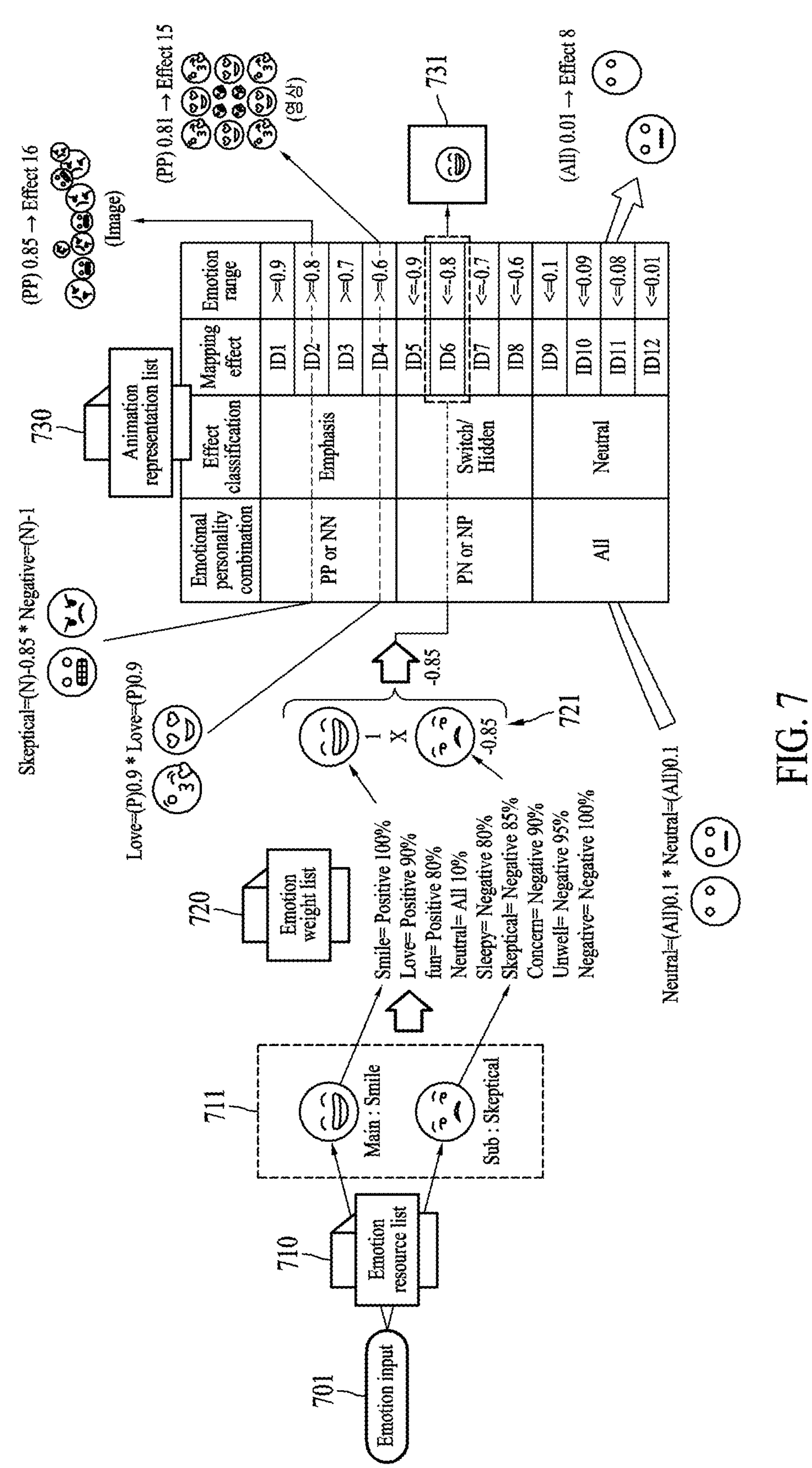
FIG. 7 is a diagram of a selection of a recommended animation effect based on an emotion weight according to an example embodiment.

FIG. 7 is a diagram of a selection of a recommended animation effect based on an emotion weight according to an example embodiment.

According to an example embodiment, an electronic device (e.g., the electronic device 101 of FIG. 1) may extract emotion representation contents 711 from a series of user inputs (e.g., an emotion input 701) as described above with reference to FIG. 5. For example, the electronic device may identify matching emotion representation contents 711 from an emotion resource list 710 in response to the emotion input 701. In an example shown in FIG. 7, the electronic device may extract a smile emoji and a skeptical emoji as main content and sub-content, respectively.

The electronic device may determine an emotion representation (e.g., a positive emotion, a negative emotion, and a neutral emotion) corresponding to an emotion category identified based on an emotion weight list 720. For example, in the example of FIG. 7, the electronic device may determine an emotion weight (e.g., "1") of 100% as a positive emotion for the smile emoji and determine an emotion weight (e.g., "−0.85") of 85% as a negative emotion for the skeptical emoji. The electronic device may calculate an emotion score for an emotion combination of a plurality of emotion representation contents, based on emotion weights mapped for each of the plurality of emotion representation contents. For example, the electronic device may calculate an emotion score by multiplying emotion weights of the plurality of emotion representation contents. In FIG. 7, the electronic device may calculate "−0.85" as an emotion score for an emotion combination 721.

The electronic device may determine a recommended animation effect corresponding to the emotion score. For example, the electronic device may retrieve a recommended animation effect matching an emotion score calculated from an animation representation list 730. For example, in response to the calculated emotion score being a positive number, the electronic device may determine an emphasis effect as a recommended animation representation. In another example, in response to the calculated emotion score being a negative number, the electronic device may determine a switch effect as a recommended animation representation. In another example, emotion ranges may be allocated for each of a plurality of animation representations in the animation representation list 730. The emotion range may be defined by at least one of an upper emotion limit and a lower emotion limit. The electronic device may determine an animation representation having an emotion range to which the calculated emotion score belongs among the plurality of animation representations as a recommended animation representation.

In an example, the electronic device may determine a first animation representation 731 (e.g., a switch effect) having an emotion range (e.g., a range of "−0.8" or less) matching "−0.85" that is the emotion score calculated for the emotion combination 721 of FIG. 7 as a recommended animation representation. The electronic device may calculate an emotion score of "0.81" from an emotion combination of a positive emotion (e.g., love) of "0.9" and a positive emotion of "0.9", and may determine a second animation representation (e.g., an emphasis effect) having an emotion range (e.g., a range of "0.6" or greater) matching the calculated emotion score of "0.81" as a recommended animation representation. The electronic device may calculate an emotion score of "0.85" from an emotion combination of a negative emotion (e.g., skepticism) of "−0.85" and a negative emotion (e.g., negation) of "−1", and may determine a third animation representation (e.g., an emphasis effect) having an emotion range (e.g., a range of "0.8" or greater) matching the calculated emotion score of "0.85" as a recommended animation representation. In addition, the electronic device may calculate an emotion score of "0.01" from an emotion combination of a neutral emotion of "0.1" and a neutral emotion of "0.1", and may determine a fourth animation representation (e.g., a neutral effect) having an emotion range (e.g., a range in which an absolute value is less than or equal to "0.08") matching the calculated emotion score of "0.01" as a recommended animation representation. For convenience of description, a recommendation of one animation representation for each emotion combination has been described, however, the example embodiments are not limited thereto. If an emotion score calculated from an emotion combination commonly matches emotion ranges of the plurality of animation representations, the electronic device may also determine a portion or all of the plurality of animation representations as a recommended animation representation.

Hereinafter, an emphasis effect, a negative effect, and a neutral effect will be described.

Figure 8:
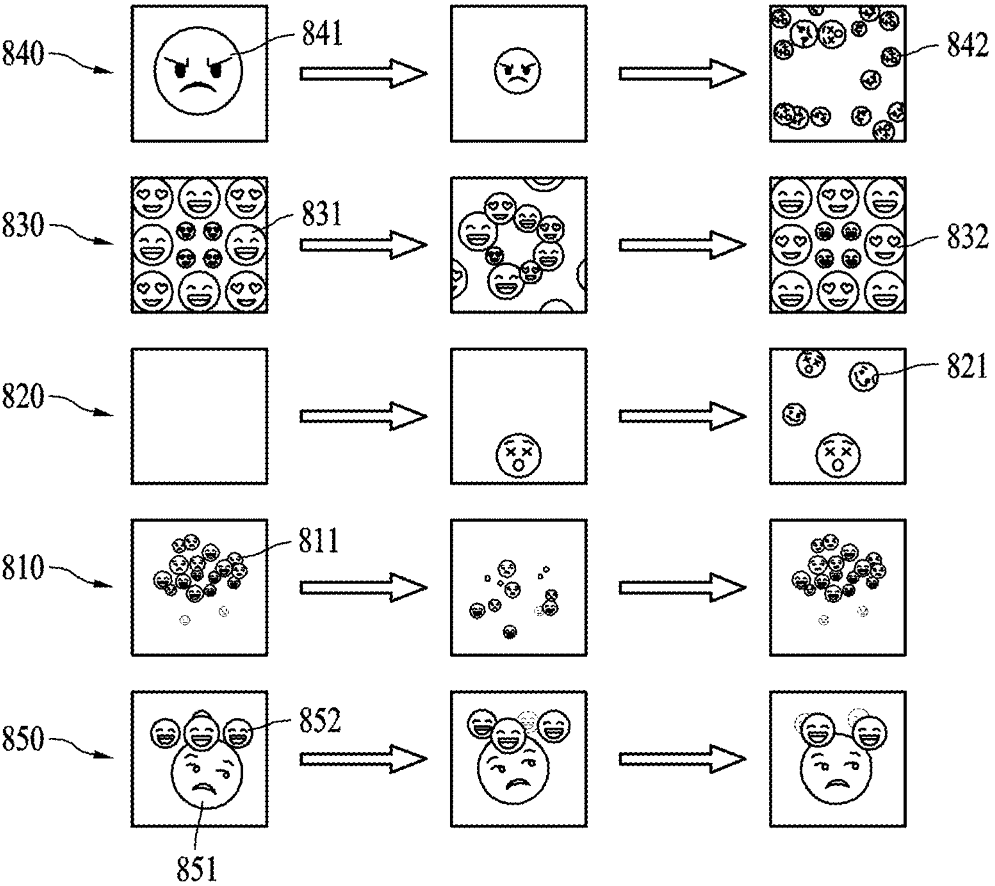
FIG. 8 is a diagram of an example of applying an emphasis effect according to an example embodiment.

FIG. 8 is a diagram of an example of applying an emphasis effect according to an example embodiment.

A processor (e.g., the processor 120 of FIG. 1) of an electronic device (e.g., the electronic device 101 of FIG. 1) according to an example embodiment may visualize at least one emotion representation content among a plurality of emotion representation contents by applying an emphasis effect of copying the at least one emotion representation content to a plurality of graphic representations, in response to the plurality of emotion representation contents representing one emotion combination between a combination of positive emotions and a combination of negative emotions. FIG. 8 illustrates various examples of the emphasis effect. In an emphasis effect of distinguishing between main content and sub-content, the main content may be visualized in a larger area than the sub-content before the main content is copied.

A first emphasis effect 810 may be an effect of repeating an operation of copying emotion representation contents to a plurality of graphic representations 811, turning each graphic representation gradually opaque at a random position, and turning each graphic representation transparent to make it disappear.

A second emphasis effect 820 may be an effect of repeating an operation of moving a plurality of graphic representations obtained by copying a plurality of emotion representation contents 821 such that the graphic representations fall from top to bottom.

In a third emphasis effect 830 (e.g., a merry-go-round effect), a first graphic representation of main content 831 with a first size, and a second graphic representation of sub-content 832 may be alternately arranged along an outer area among areas defined for emotion combined content, and the sub-content 832 may be arranged with a second size less than the first size in an inner area. The third emphasis effect 830 may be an effect of repeating an operation of making graphic representations of the outer area to enter the inner area in response to a reduction from the first size to the second size together with a rotational movement, and making graphic representations of the inner area to move to the outer area in response to an increase from the second size to the first size together with a rotational movement.

A fourth emphasis effect 840 (e.g., an explosion effect) may be an effect of repeating an operation of visualizing main content 841 first, temporarily reducing a size of the main content 841, and copying and outputting the main content 841 and sub-content 842.

A fifth emphasis effect 850 may be an effect of repeating an operation of rotating sub-content 852 about main content 851 while outputting the sub-content 852 in a size less than that of main content 851.

However, the emphasis effects of FIG. 8 are merely for description, and there is no limitation thereto.

Figure 9A:
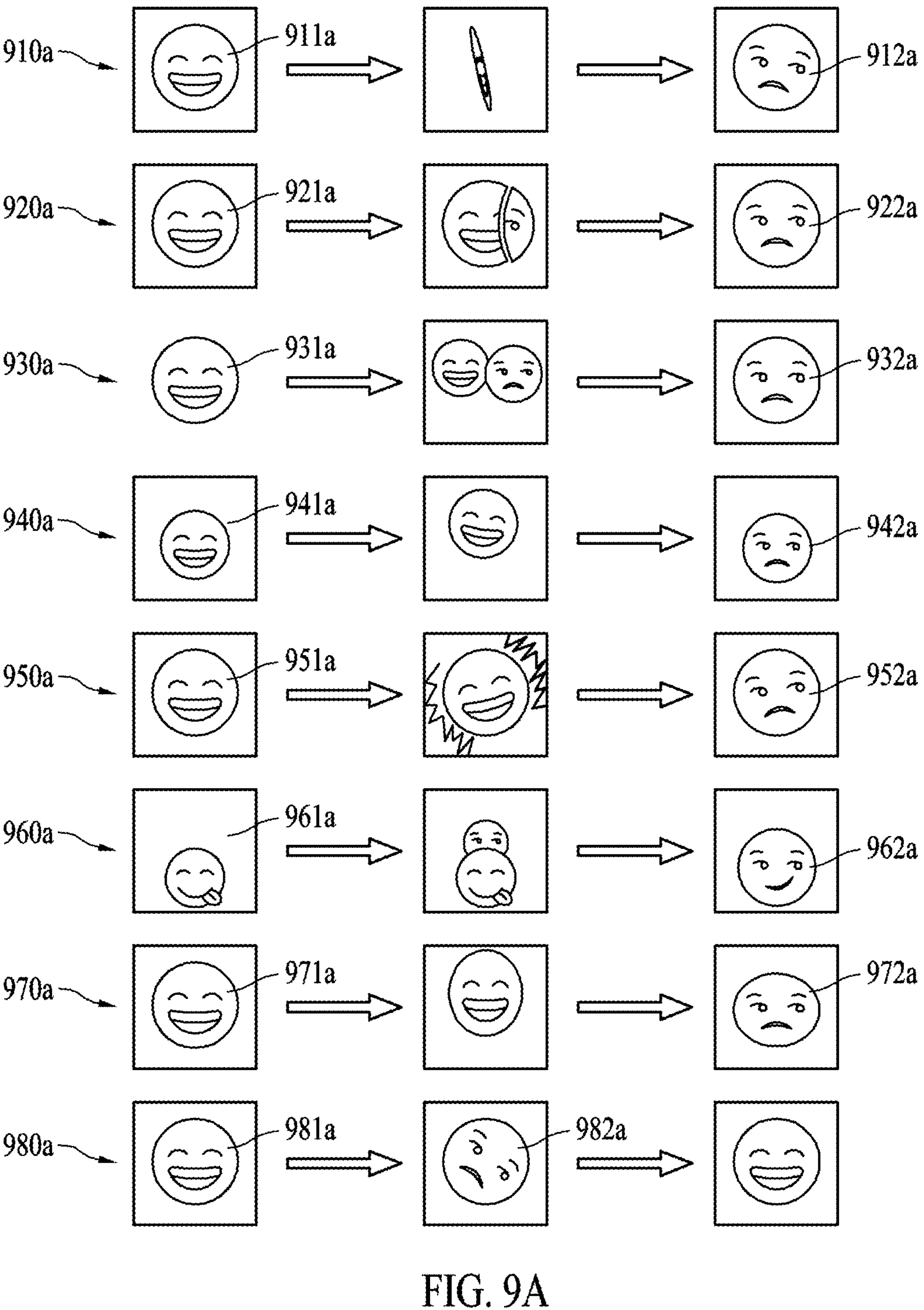
FIG. 9A is a diagram of an example of applying a switch effect according to an example embodiment.
Figure 9B:
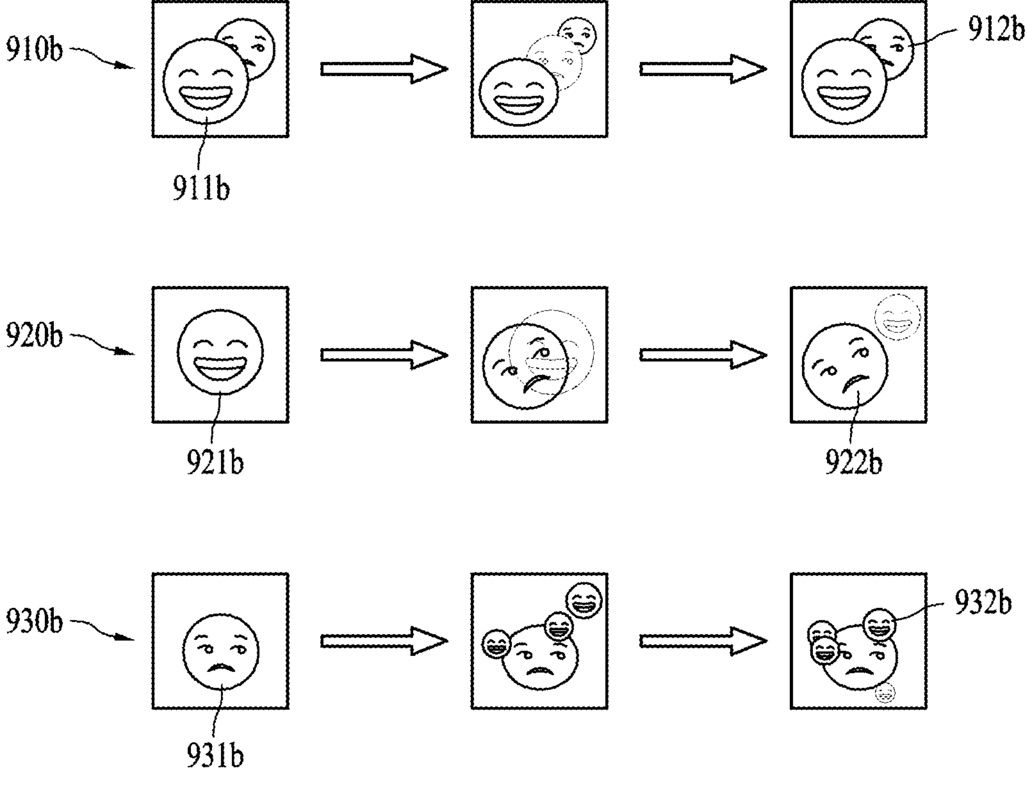
FIG. 9B is a diagram of an example of applying a hiding effect among switch effects according to an example embodiment.

FIG. 9A is a diagram of an example of applying a switch effect according to an example embodiment. FIG. 9B is a diagram of an example of applying a hiding effect among switch effects according to an example embodiment.

A processor (e.g., the processor 120 of FIG. 1) of an electronic device (e.g., the electronic device 101 of FIG. 1) according to an example embodiment may apply a switch effect of switching from one emotion representation content to another emotion representation content among a plurality of emotion representation contents to the plurality of emotion representation contents, in response to the one emotion representation content representing a positive emotion and the other emotion representation content representing a negative emotion. FIG. 9A illustrates examples of switch effects. The processor may perform at least one of an operation of visualizing main content prior to sub-content among the plurality of emotion representation contents to which the switch effect is applied, and an operation of overlaying the main content on the sub-content.

For example, a first switch effect **910*a* may be an effect of repeating an operation of visualizing main content 911*a* first, and allowing sub-content 912*a* to appear while the main content 911*a*** is flipping and disappearing.

A second switch effect **920*a* may be an effect of repeating an operation of visualizing main content 921*a* first and gradually overlaying sub-content 922*a* on the main content 921*a*** in one direction (e.g., a direction from the right to the left).

A third switch effect **930*a* may be an effect of repeating an operation of visualizing main content 931*a* first, revealing hidden sub-content 932*a* while moving the main content 931*a* to one side (e.g., a left side), and of overlaying the sub-content 932*a* on the main content 931*a* while moving the main content 931*a* to another side (e.g., a right side) and moving the sub-content 932*a*** to the one side.

A fourth switch effect **940*a* may be an effect of repeating an operation of visualizing main content 941*a* first, and allowing sub-content 942*a* instead of the main content 941*a* to appear while tilting the main content 941*a***.

A fifth switch effect **950*a* may be an effect of repeating an operation of outputting main content 951*a*, which is visualized first, by a shaking motion and changing a graphic representation to sub-content 952*a***.

A sixth switch effect **960*a* may be an effect of repeating an operation of revealing hidden sub-content 962*a* by overlaying and displaying the sub-content 962*a* on main content 961*a* such that the hidden sub-content 962*a* jumps over the main content 961***a*, while gradually reducing the main content 961*a* which is visualized first.

A seventh switch effect 970*a* may be an effect of repeating an operation of allowing sub-content 972*a* instead of main content 971*a*, which is visualized first, to appear while moving the main content 971*a* to one side (e.g., upwards).

An eighth switch effect 980*a* may be an effect of repeating an operation of outputting sub-content 982*a*, instead of main content 981*a*, while rolling the main content 981*a* to one side (e.g., a right side), and returning the main content 981*a* to the original position, that is, another side (e.g., a left side) such that the main content 981*a* appears again.

FIG. 9B illustrates the hiding effect among the switch effects.

The hiding effect may be an effect of temporarily removing at least one of extracted emotion representation contents from a screen or allowing at least one emotion representation content to disappear. For example, in the hiding effect, main content among the extracted emotion representation contents may be maintained and may be visualized in a larger size than that of sub-content.

A first hiding effect 910*b* may be an effect of repeating an operation of outputting sub-content 912*b* under main content 911*b* and fading out the sub-content 912*b* while gradually decreasing a size of the sub-content 912*b*.

A second hiding effect 920*b* may be an effect of repeating an operation of reducing a size of main content 921*b* while allowing the main content 921*b* to be transparent and outputting sub-content 922*b* instead.

A third hiding effect 930*b* may be an effect of repeating an operation of allowing sub-content 932*b* to appear and fade out while main content 931*b* is being output.

Figure 10:
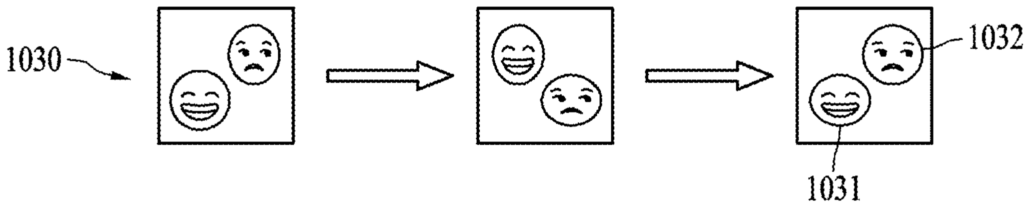
FIG. 10 is a diagram of an example of applying a neutral effect according to an example embodiment.

FIG. 10 is a diagram of an example of applying a neutral effect according to an example embodiment.

A processor (e.g., processor 120 of FIG. 1) of an electronic device (e.g., the electronic device 101 of FIG. 1) according to an example embodiment may apply a neutral effect of maintaining a simultaneous output of a plurality of emotion representation contents in a given time period to the plurality of emotion representation contents, in response to at least one emotion representation content among the plurality of emotion representation contents representing a neutral emotion. The given time period may be a time set for motion reproduction of emotion combined content and may include, for example, all time periods in which an animation is played back.

A neutral effect 1030 of FIG. 10 may be an effect of repeating an operation of alternately moving first content 1031 and second content 1032 to one side (e.g., upwards) and another side (e.g., downwards). For example, the neutral effect 1030 may be an effect of alternately jumping the first content 1031 and the second content 1032.

Figure 11:
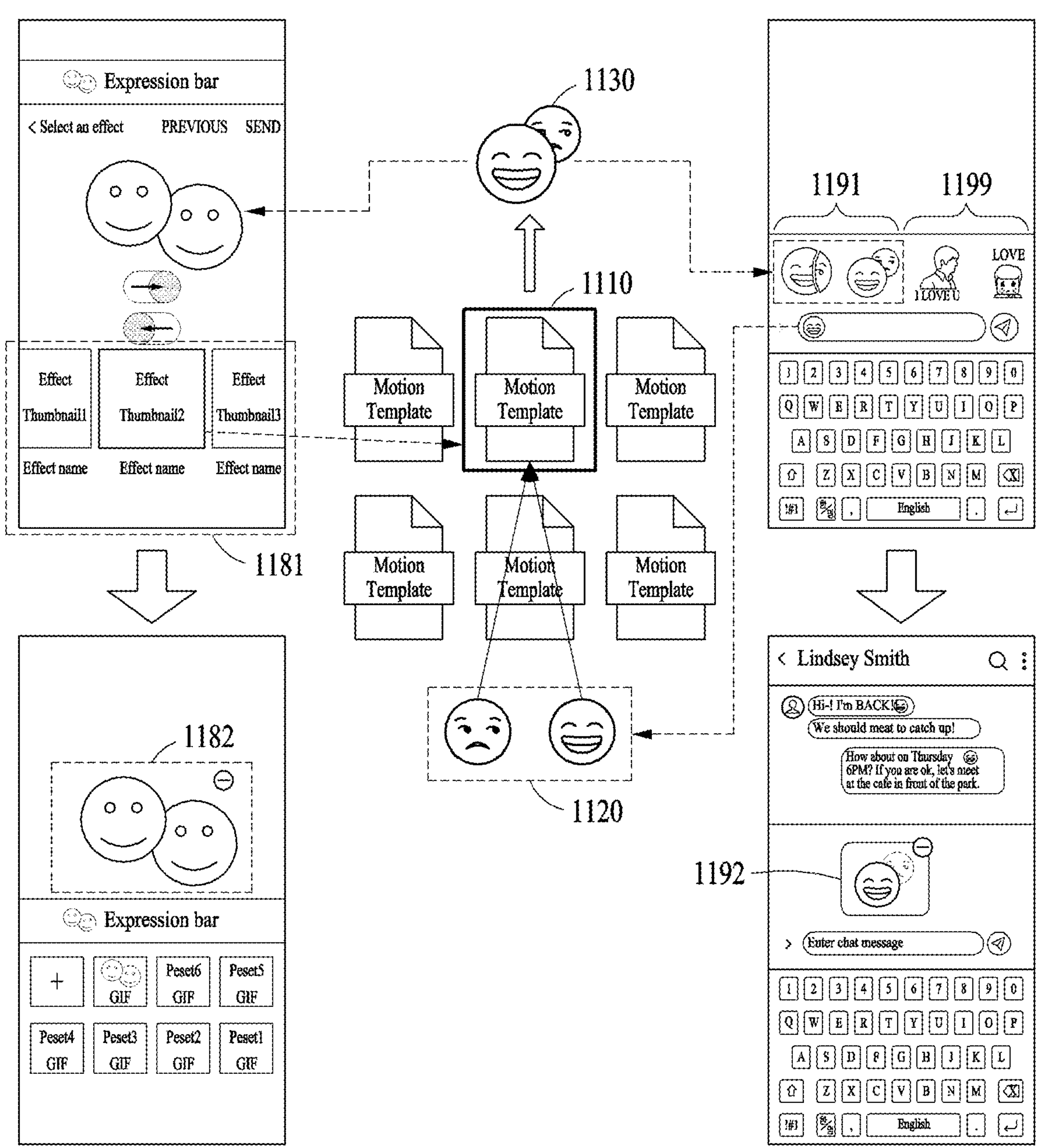
FIGS. 11, 12 and 13 are diagrams of an output of emotion combined content and preview rendering using a motion template according to an example embodiment.
Figure 12:
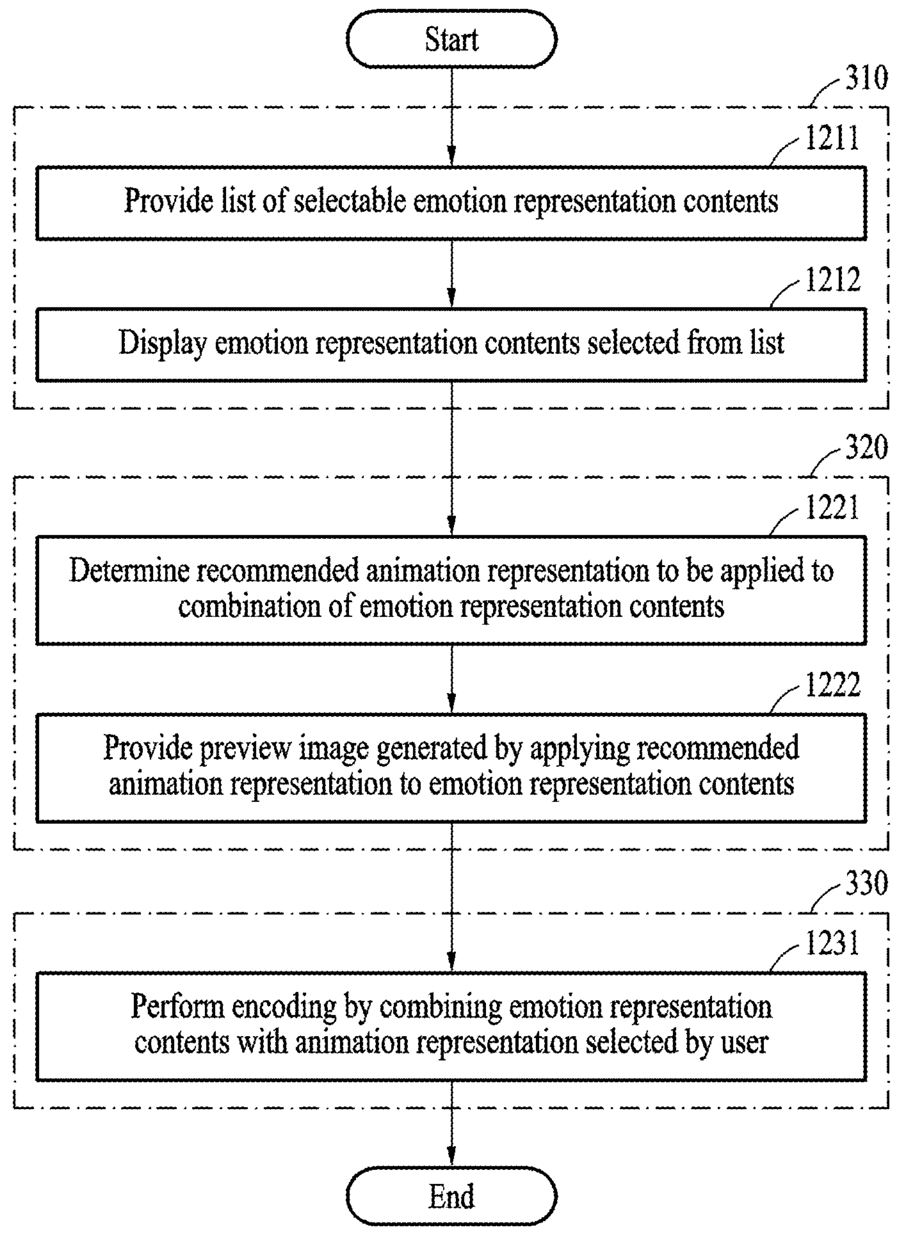
Figure 13:
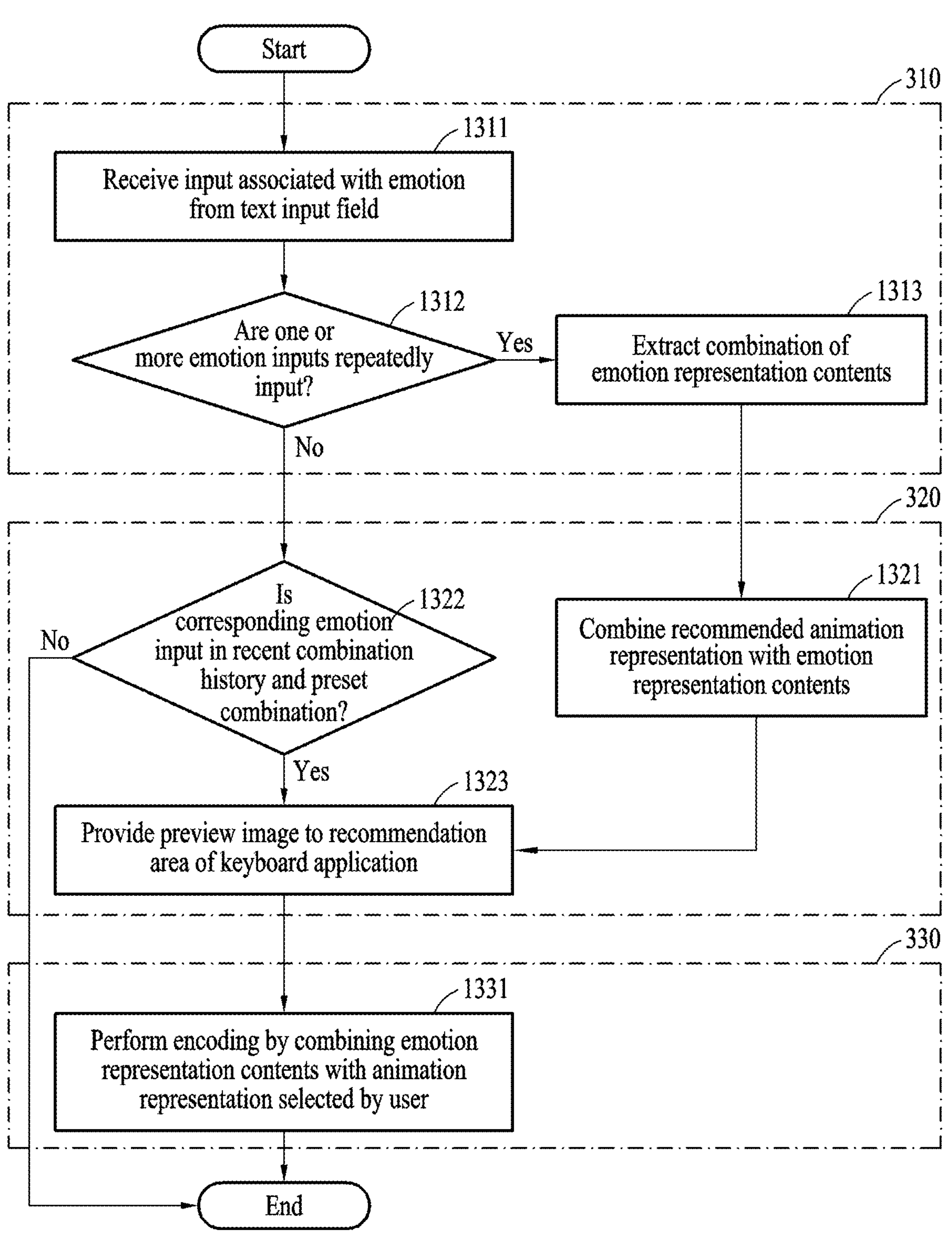

FIGS. 11, 12 and 13 are diagrams of an output of emotion combined content and preview rendering using a motion template according to an example embodiment. FIGS. 12 and 13 show example embodiments of operations 310, 320 and 330 of FIG. 3.

According to various example embodiments, an electronic device (e.g., the electronic device 101 of FIG. 1) may visualize a preview representation 1130 in a content generation interface, or in a recommendation area of a keyboard application.

For example, the electronic device may transmit a plurality of emotion representation contents 1120 extracted as described above in a form of a bitmap to a motion template file 1110 corresponding to an animation representation (e.g., a recommended animation representation). The animation representation may be a recommended animation representation determined as described above, and an animation representation selected by a user. The electronic device may generate the preview representation 1130 by combining the emotion representation contents 1120 with the motion template 1110 and by rendering an animation view.

For example, in operation 1211, the electronic device may enter the content generation interface and provide a list of selectable emotion representation contents. In operation 1212, the electronic device may display emotion representation contents selected from the list. In operation 1221, the electronic device may determine a recommended animation representation to be applied to a combination of emotion representation contents as described above with reference to FIGS. 1 through 11. In operation 1222, the electronic device may provide a preview image generated by applying the recommended animation representation to emotion representation contents. For example, the electronic device may combine a motion template 1110 corresponding to an animation representation currently selected in an animation selection interface 1181 with the above-described emotion representation contents 1120. The electronic device may output the generated preview representation 1130 to a preview area in the content generation interface. In operation 1231, the electronic device may perform encoding by combining the emotion representation contents with an animation representation selected by a user. For example, when the preview representation 1130 is confirmed by the user, the electronic device may generate emotion combined content 1182 by encoding the preview representation 1130 into an animated graphics interchange format (AGIF) format. The electronic device may share the emotion combined content 1182 with other electronic devices and/or other applications.

For example, in operation 1311, the electronic device may execute the keyboard application and receive an input (e.g., an emotion input) associated with an emotion from a text input field. In operation 1312, the electronic device may determine whether one or more emotion inputs are repeatedly input. When the one or more emotion inputs are repeatedly input, the electronic device may extract an emotion combination of emotion representation contents in operation 1313. In operation 1321, the electronic device may combine a recommended animation representation with the emotion representation contents. In operation 1323, the electronic device may provide a preview image to a recommendation area of the keyboard application. For example, the electronic device may visualize the preview representation 1130, in which a recommended animation representation determined based on an emotion combination of a plurality of emotion representation contents is applied to the plurality of emotion representation contents, in a recommendation area 1191 of the keyboard application. When the one or more emotion inputs are not repeatedly input, the electronic device may determine whether a corresponding emotion input (e.g., a single emotion input) is included in a recent combination history and a preset combination in operation 1322. When the corresponding emotion input is not included in the recent combination history and the preset combination, the electronic device may terminate an operation related to emotion representation content. When the corresponding emotion input is included in the recent combination history and the preset combination, the electronic device may provide a preview image matching the corresponding emotion input in the recent combination history and the preset combination to the recommendation area in operation 1323 described above. For reference, the electronic device may also provide other recommended contents 1199 together in addition to the preview representation 1130. In operation 1331, the electronic device may perform encoding by combining the emotion representation contents with an animation representation selected by a user. When the preview representation 1130 is confirmed by the user, the electronic device may generate emotion combined content 1192 by encoding the preview representation 1130 into an AGIF format. The electronic device may transmit the emotion combined content 1192 to a terminal of another user through an MMS or SNS application. In addition, the electronic device may store and manage a file corresponding to the generated emotion combined content 1192, using an internal memory.

Figure 14:
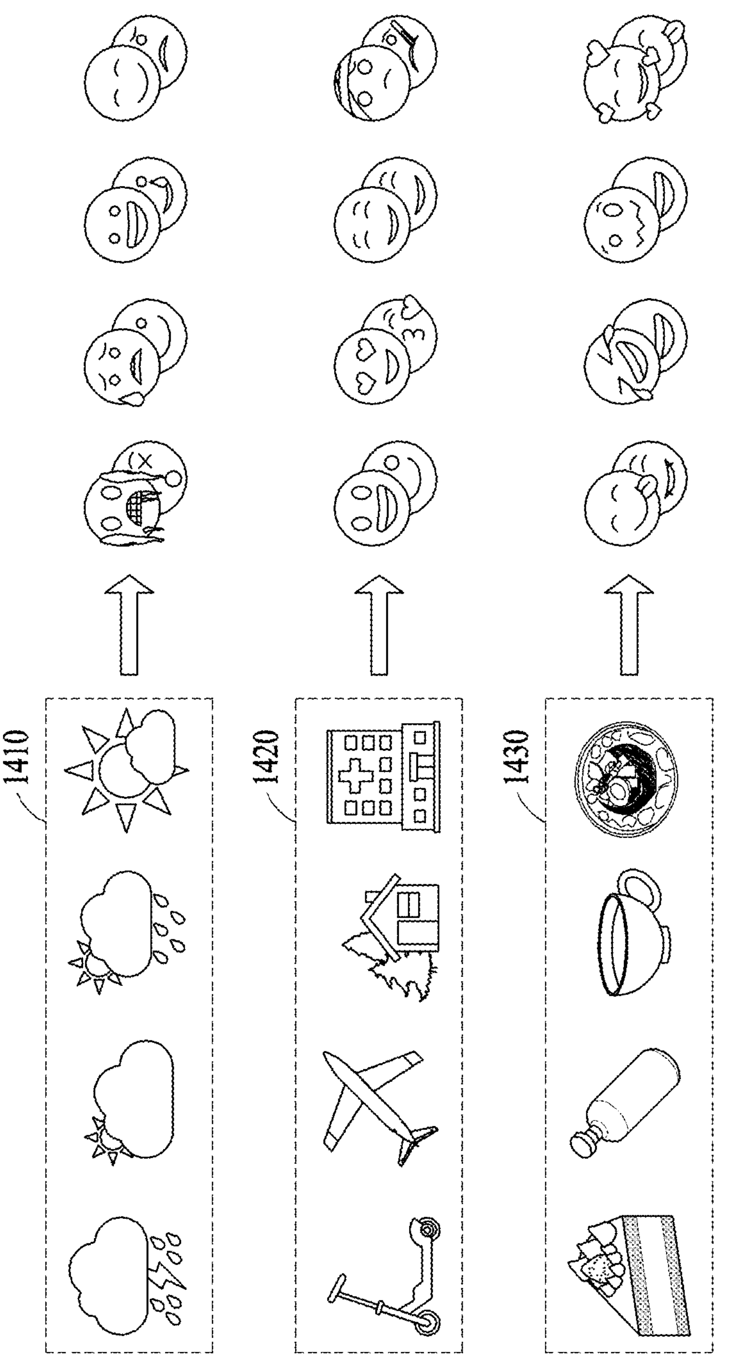
FIG. 14 is a diagram of a presentation of emotion combined content based on additional information according to an example embodiment.

FIG. 14 is a diagram of a presentation of emotion combined content based on additional information according to an example embodiment.

The additional information may include weather information 1410, location information 1420, and food information 1430. The weather information 1410 may include information on the weather corresponding to a location and time of a user. The location information 1420 may include information on a location and transportation of a user determined based on positioning module (e.g., global navigation satellite system (GNSS)). The food information 1430 may include information on food eaten by a user.

However, the additional information shown in FIG. 14 is merely an example, and example embodiments are not limited thereto. For example, the additional information may include a variety of information that may be linked to emotions according to a design.

For example, an electronic device (e.g., the electronic device 101 of FIG. 1) may generate emotion combined content based on the weather information 1410. When the weather information 1410 indicates cold weather, the electronic device may generate emotion combined content by combining emotion representation content indicating cold with emotion representation content indicating pain. In an example of cloudy weather, the electronic device may combine emotion representation content indicating an embarrassing emotion with emotion representation content indicating a smile. In an example of wet weather, the electronic device may combine emotion representation content indicating a smile with emotion representation content indicating tears. In an example of weather with few clouds, the electronic device may combine emotion representation content indicating a smiley emotion with emotion representation content indicating an embarrassing emotion.

In another example, the electronic device may generate emotion combined content based on the location information 1420. When the location information 1420 indicates a movement of a kickboard, the electronic device may combine emotion representation content indicating a broad smile with emotion representation content indicating a smile. When the location information 1420 indicates an airplane, the electronic device may combine emotion representation content indicating a happy emotion with emotion representation content indicating a kiss. When the location information 1420 indicates a house, the electronic device may combine emotion representation content indicating coziness with emotion representation content indicating smiling. When the location information 1420 indicates a hospital, the electronic device may combine emotion representation contents indicating pain.

In another example, the electronic device may generate emotion combined content based on the food information 1430. When the food information 1430 indicates cake, the electronic device may combine emotion representation contents indicating happiness. When the food information 1430 indicates champagne, the electronic device may combine emotion representation contents indicating celebration. When the food information 1430 indicates coffee, the electronic device may combine emotion representation content indicating a bitter taste with emotion representation content indicating smiling. When the food information 1430 represents pasta, the electronic device may combine emotion representation contents indicating happiness.

However, the description of the emotion combined contents based on the additional information provided with reference to FIG. 14 is merely an example, and the example embodiments are not limited thereto. For example, the description of the emotion combined contents may vary depending on a design.

Figure 15:
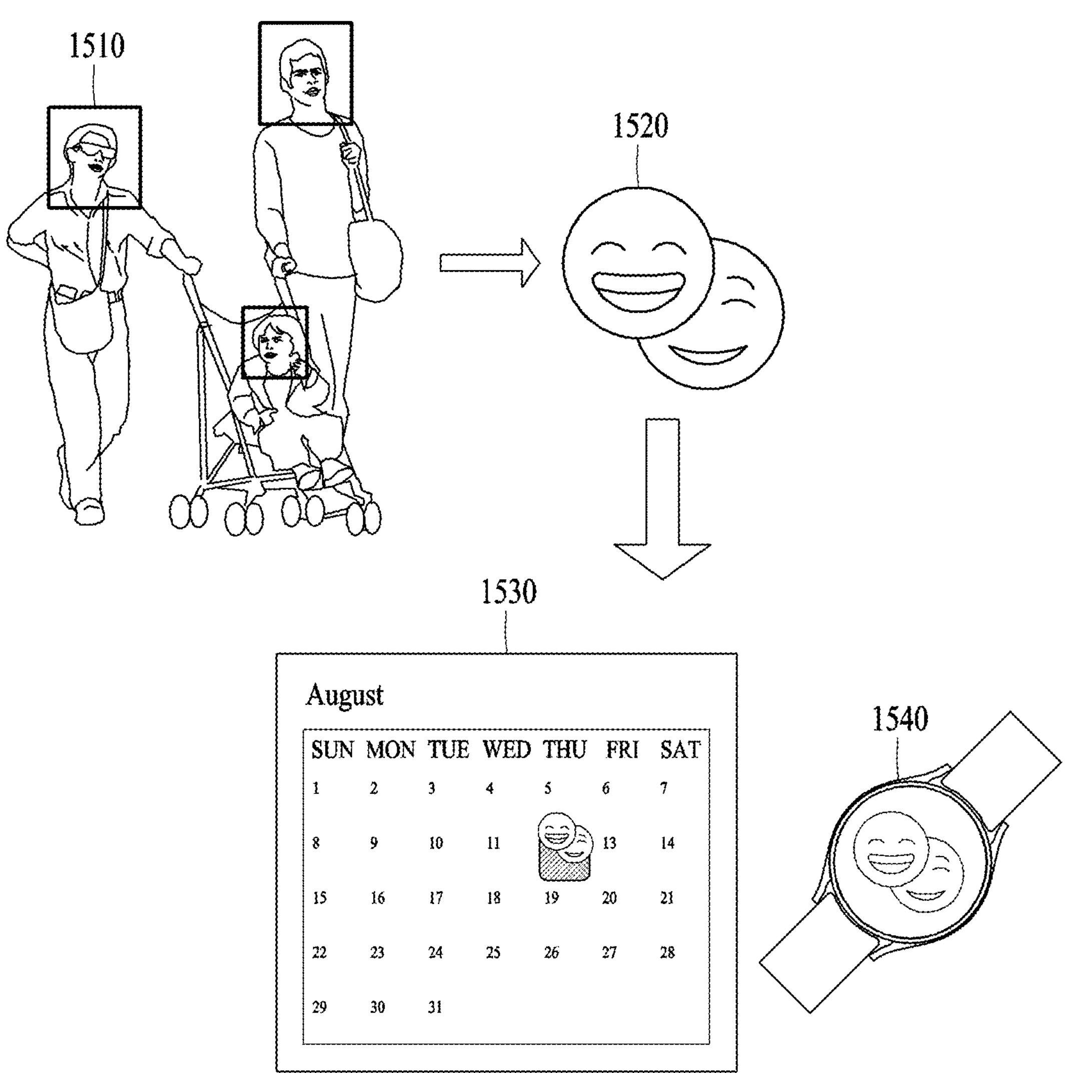
FIG. 15 is a diagram of a presentation of emotion combined content based on an image analysis according to an example embodiment.

FIG. 15 is a diagram of a presentation of emotion combined content based on an image analysis according to an example embodiment.

An electronic device (e.g., the electronic device 101 of FIG. 1) according to an example embodiment may analyze emotions of faces detected in an image by analyzing the image. The electronic device may extract a plurality of emotions by analyzing emotions and average values of faces 1510 appearing in an image through an image analysis, and may generate emotion combined content 1520 based on an extraction result. For example, the electronic device may recommend the generated emotion combined content 1520 on a camping day of a calendar 1530. The electronic device may also provide the generated emotion combined content 1520 to a wearable device 1540 of a user who engages in activities such as exercise and camping.

Figure 16:
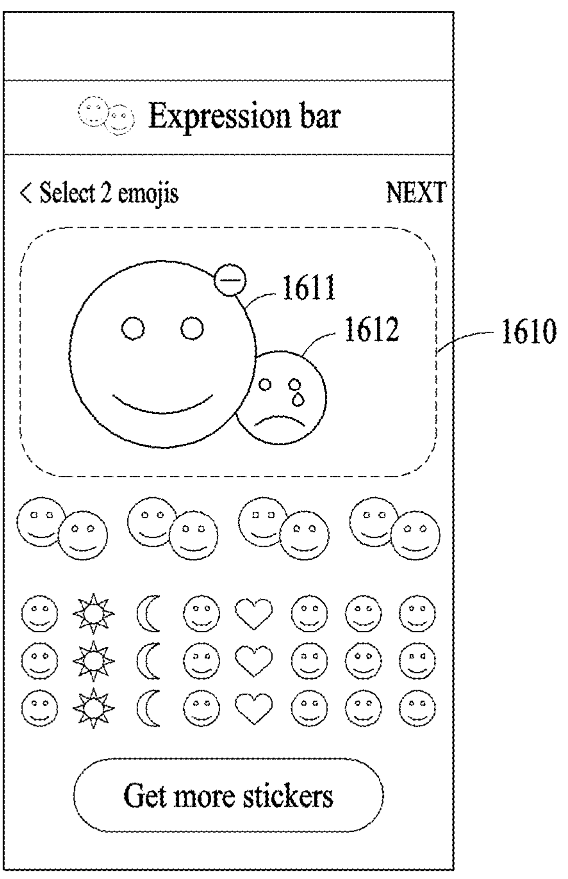
FIG. 16 is a diagram of a size adjustment for each emotion representation content in emotion combined content according to an example embodiment.

FIG. 16 is a diagram of a size adjustment for each emotion representation content in emotion combined content according to an example embodiment.

An electronic device (e.g., the electronic device 101 of FIG. 1) according to an example embodiment may adjust sizes of a plurality of emotion representation contents selected in a content generation interface. For example, to generate emotion combined content and/or a preview representation, the electronic device may determine emotion representation content that is more frequently used by a user than the other emotion representation contents. The electronic device may make a recommendation in a preview area 1610 by adjusting a size of each emotion representation content based on a frequency of use of a plurality of extracted emotion representation contents. For example, when first emotion representation content 1611 and second emotion representation content 1612 are used by a user in a first proportion (e.g., 80%) and a second proportion (e.g., 20%), respectively, the electronic device may determine a size of the first emotion representation content 1611 to be a size corresponding to the first proportion and determine a size of the second emotion representation content 1612 to be a size corresponding to the second proportion that is less than the first proportion.

Figure 17:
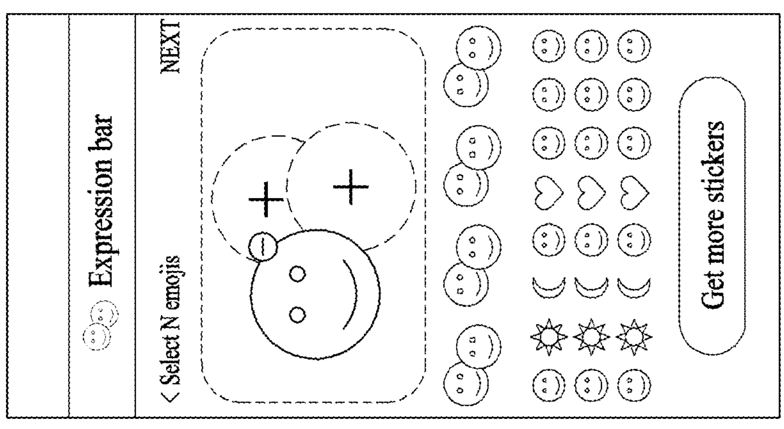
FIG. 17 is a diagram of an interface for receiving three or more emotion representation contents according to an example embodiment.
Figure 17:
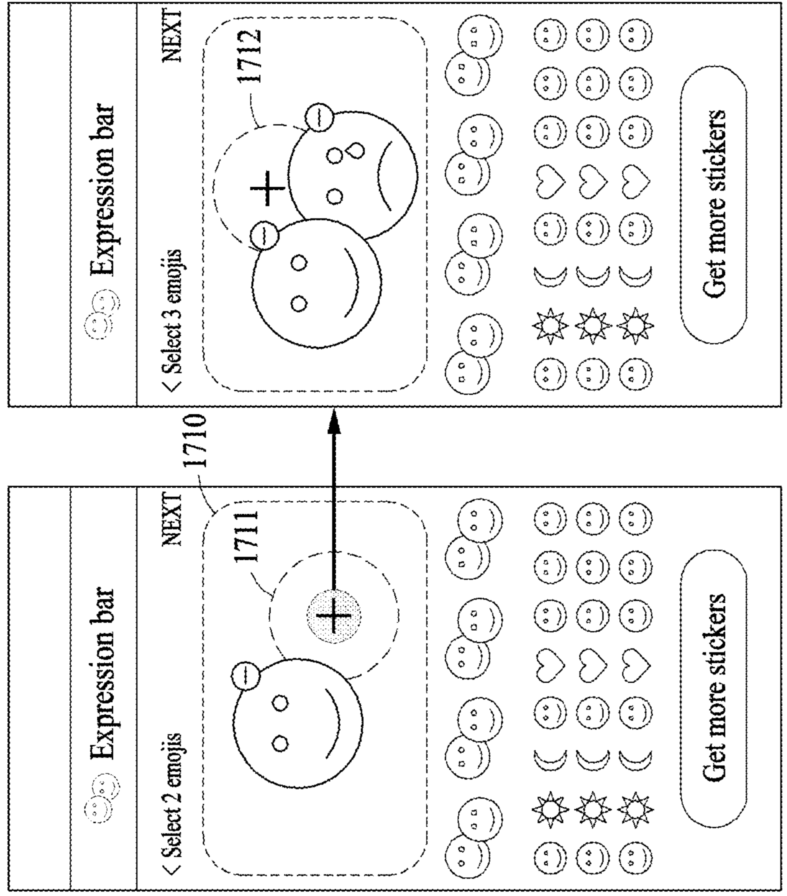

FIG. 17 is a diagram of an interface for receiving three or more emotion representation contents according to an example embodiment.

An electronic device (e.g., the electronic device 101 of FIG. 1) may increase a limited number of emotion representation contents that may be combined based on a user input in a content generation interface. For example, the electronic device may basically provide a basic limited number (e.g., two) of slots in a preview area 1710. The electronic device may add a new slot 1712 in response to a user input for an empty slot 1711 among slots. In another example, the electronic device may provide a slot for enabling a selection of additional content every time emotion representation content is additionally selected.

FIG. 18 is a diagram of an interface for applying a plurality of animation effects according to an example embodiment.

An electronic device (e.g., the electronic device 101 of FIG. 1) according to an example embodiment may select a plurality of animation representations and apply the animation representations to a combination of a plurality of extracted emotion representation contents, when generating emotion combined content. For example, the electronic device may select a first animation representation 1810 in a content generation interface. The electronic device may provide a preview representation, to which the first animation representation 1810 is applied, in a preview area. When a second animation representation 1820 is additionally selected in a state in which the first animation representation 1810 is selected, the electronic device may provide a preview representation to which an animation representation in which the first animation representation 1810 and the second animation representation 1820 are mixed is applied. In an example, when a representation of an exploding emoji and a representation of a rotating emoji are combined, the electronic device may represent the emojis in such a manner that the emojis rotate while exploding. In another example, the electronic device may sequentially represent the emojis in such a manner that the emojis rotate after exploding.

Figure 19:
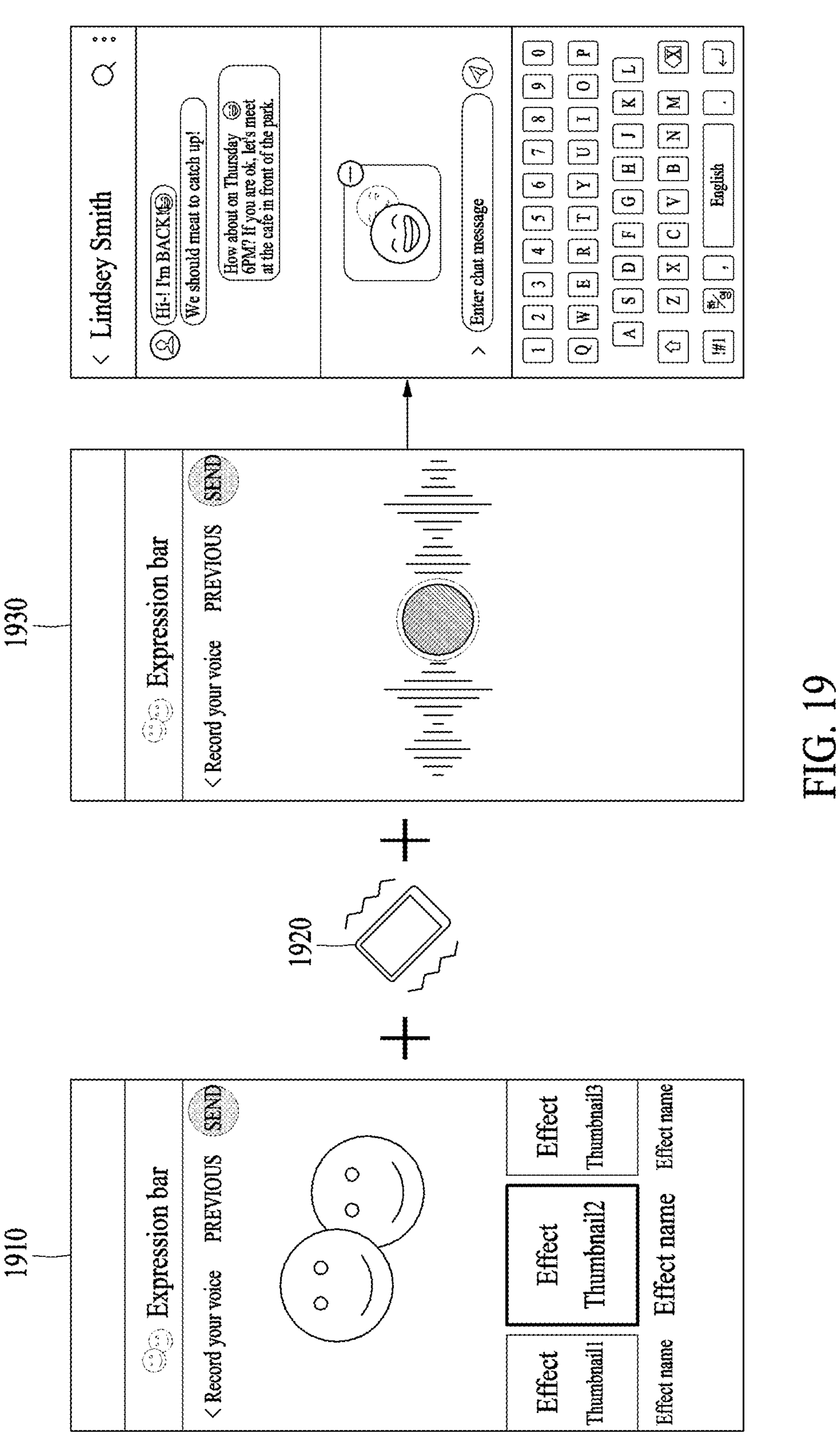
FIG. 19 is a diagram of an example of combining and providing a tactile output and an auditory output together with a visual output according to an example embodiment.

FIG. 19 is a diagram of an example of combining and providing a tactile output and an auditory output together with a visual output according to an example embodiment.

An electronic device (e.g., the electronic device 101 of FIG. 1) according to an example embodiment may provide an additional effect in addition to an animation representation together with emotion combined content 1910. For example, the electronic device may provide vibration feedback 1920 mapped to an animation representation applied to the emotion combined content 1910 together, while generating the emotion combined content 1910. In addition, the electronic device may map sound data 1930 (e.g., a voice recording file) to the emotion combined content 1910 while generating the emotion combined content 1910, to play the sound data 1930 together with a motion of the emotion combined content 1910.

Figure 20:
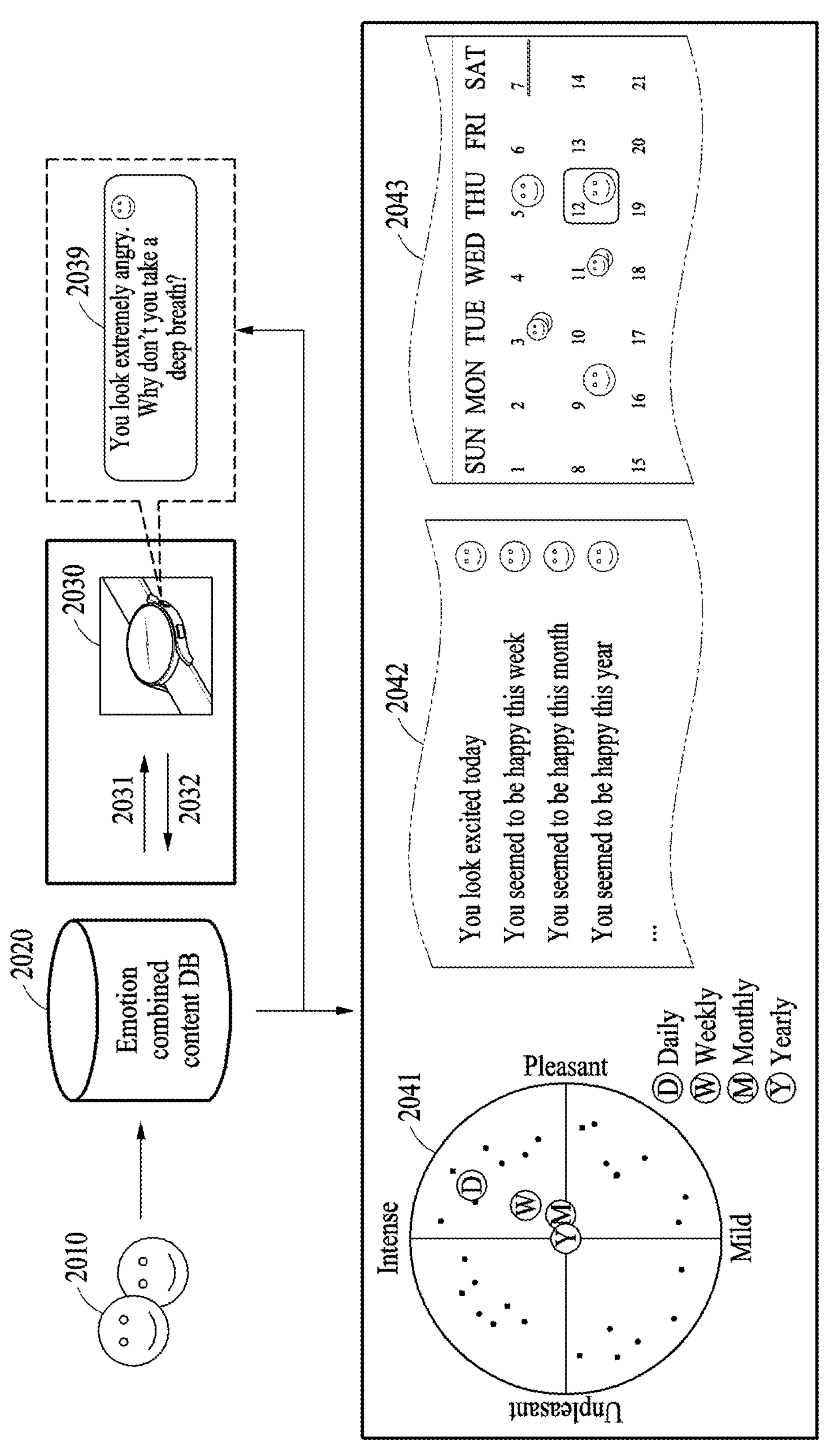
FIG. 20 is a diagram of an example of managing emotion combined content according to an example embodiment.

FIG. 20 is a diagram of an example of managing emotion combined content according to an example embodiment.

An electronic device (e.g., the electronic device 101 of FIG. 1) according to an example embodiment may store generated emotion combined content 2010 in an emotion combined content database (DB) 2020. The emotion combined content DB 2020 may be stored in the electronic device, however, the example embodiments are not limited thereto. The emotion combined content DB 2020 may also be stored in an external server.

The electronic device may establish a communication with a wearable device 2030 and perform an operation related to emotion combined content with respect to the wearable device 2030. For example, in operation 2031, the electronic device may trigger a body measurement in the wearable device 2030 when emotion combined content is generated. In operation 2032, the electronic device may receive measured biometric data (e.g., an electrocardiogram, a heartbeat, a respiration rate, a blood pressure, and a stress level) from the wearable device 2030. The electronic device may correct emotional intensity based on the measured biometric data. The wearable device 2030 may be, for example, an accessory device including a smart watch. The wearable device 2030 may provide a health activity suggestion and a notification for a recognized emotion as a notification 2039 associated with an emotion to a user.

In response to at least one of emotion combined content corresponding to an emotion category being generated a predetermined number of times or greater during a predetermined period and a numerical value of the biometric data continuing to be greater than or equal to a threshold point, the electronic device may record the emotion combined content for each period.

In an example, the electronic device may arrange and record representative emotion combined content among emotion combined contents generated in units of days, weeks, months, and years in a health management application 2041, based on an emotional intensity for each emotion category. In another example, the electronic device may provide text indicating a representative emotion and emotion combined content in units of days, weeks, months, and years in a health management application 2042. In another example, the electronic device may display a date on which emotion combined content is to be generated, and representative emotion combined content that is generated, in a calendar application 2043.

In the above-described examples, when a number of times emotion combined content is generated during a unit period (e.g., in units of days, weeks, months, and years) is greater than or equal to "n" that is an integer greater than or equal to "2", the electronic device may count a frequency of use of each emotion representation content. When the most frequently used emotion representation content is greater than or equal to a threshold proportion, the electronic device may display the emotion representation content. When the number of times emotion combined content is generated during the unit period is less than "n", the electronic device may display content generated by a user.

While the disclosed embodiments has been particularly shown and described with reference to examples thereof, it will be understood that various changes in form and details may be made therein without departing from the spirit and scope of the following claims.

What is claimed is:

1. An electronic device, comprising:

a display;

a processor; and memory storing instructions that, when executed by the processor, cause the electronic device to:

display, through the display, a text input field in a messaging service application;

in response to a first user input for selecting a first emotion representation content from a plurality of emotion representation contents, present the first emotion representation content in the text input field;

in response to a second user input for selecting a second emotion representation content from the plurality of emotion representation contents, generate an animation corresponding to an emotion combination of the first emotion representation content and the second emotion representation content, and present the second emotion representation content in the text input field and a preview representation of the generated animation; and based on selecting the preview representation, output the generated animation corresponding to the emotion combination of the first emotion representation content and the second emotion representation content.

2. The electronic device of claim 1, wherein the instructions, when executed by the processor, further cause the electronic device to:

in response to the first user input, present a first representation comprising the first emotion representation content with a first animation; and based on the first emotion representation content being different from the second emotion representation content, present the preview representation with the animation being different from the first animation.

3. The electronic device of claim 2, wherein the instructions, when executed by the processor, further cause the electronic device to:

based on emotions of the first emotion representation content and the second emotion representation content being different from each other, present the preview representation with the animation being different from the first animation.

4. The electronic device of claim 1, wherein the instructions, when executed by the processor, further cause the electronic device to:

visualize the preview representation in a recommendation area of a keyboard application; and in response to the preview representation visualized in the recommendation area being selected, transmit an emotion combined content encoded corresponding to the preview representation to at least one of another application or another electronic device.

5. The electronic device of claim 1, wherein the instructions, when executed by the processor, further cause the electronic device to:

in response to selecting one or more emotion representation contents, input the one or more emotion representation contents into the text input field; and present an another preview representation based on two or more emotion representation contents with an another animation corresponding to an emotion combination of the two or more emotion representation contents, and wherein the two or more emotion representation contents are selected from inputted emotion representation contents comprising the first emotion representation content, the second emotion representation content, and the one or more emotion representation contents.

6. The electronic device of claim 5, wherein the instructions, when executed by the processor, further cause the electronic device to:

select the two or more emotion representation contents from the inputted emotion representation contents based on an input frequency and an input order of emotions of the inputted emotion representation contents.

7. The electronic device of claim 5, wherein the instructions, when executed by the processor, further cause the electronic device to:

select a main content and a sub-content from the two or more emotion representation contents based on an input frequency and an input order.

8. The electronic device of claim 7, wherein the instructions, when executed by the processor, further cause the electronic device to:

apply a first partial motion of the another animation to the main content; and apply a second partial motion of the another animation to the sub-content.

9. The electronic device of claim 1, wherein each of emotions of the first emotion representation content and the second emotion representation content is one of a positive emotion, a negative emotion, and a neutral emotion, and wherein the emotion combination of the first emotion representation content and the second emotion representation content is one of a positive emotion, a negative emotion, and a neutral emotion, or a combination of two or more thereof.

10. The electronic device of claim 1, wherein the instructions, when executed by the processor, further cause the electronic device to:

apply at least one effect of a first effect to switch from the first emotion representation content to the second emotion representation content, a second effect to copy at least one of the first emotion representation content to the second emotion representation content, and a third effect to maintain a simultaneous output of at least one of the first emotion representation content to the second emotion representation content in a given time period, to the first emotion representation content to the second emotion representation content.

11. A method implemented by a processor, the method comprising:

displaying, through the display, a text input field in a messaging service application;

in response to a first user input for selecting a first emotion representation content from a plurality of emotion representation contents, presenting the first emotion representation content in the text input field;

in response to a second user input for selecting a second emotion representation content from the plurality of emotion representation contents, generating an animation corresponding to an emotion combination of the first emotion representation content and the second emotion representation content, and presenting the second emotion representation content in the text input field and a preview representation of the generated animation; and based on selecting the preview representation, outputting the generated animation corresponding to the emotion combination of the first emotion representation content and the second emotion representation content.

12. The method of claim 11, wherein the presenting of the first emotion representation content comprises in response to the first user input, presenting a first representation comprising the first emotion representation content with a first animation, and wherein the presenting of the preview representation comprises, based on the first emotion representation content being different from the second emotion representation content, presenting the preview representation with the animation being different from the first animation.

13. The method of claim 12, wherein the presenting of the preview representation comprises:

based on emotions of the first emotion representation content and the second emotion representation content being different from each other, presenting the preview representation with the animation being different from the first animation.

14. The method of claim 11, wherein the method further comprises:

visualizing the preview representation in a recommendation area of a keyboard application; and in response to the preview representation visualized in the recommendation area being selected, transmitting an emotion combined content encoded corresponding to the preview representation to at least one of another application or another electronic device.

15. The method of claim 11, wherein the method further comprises:

in response to selecting one or more emotion representation contents, inputting the one or more emotion representation contents into the text input field; and presenting an another preview representation based on two or more emotion representation contents with an another animation corresponding to an emotion combination of the two or more emotion representation contents, and wherein the two or more emotion representation contents are selected from inputted emotion representation contents comprising the first emotion representation content, the second emotion representation content, and the one or more emotion representation contents.

16. The method of claim 15, wherein the presenting of the another preview representation comprises:

selecting the two or more emotion representation contents from the inputted emotion representation contents based on an input frequency and an input order of emotions of the inputted emotion representation contents.

17. The method of claim 15, wherein the presenting of the another preview representation comprises:

selecting a main content and a sub-content from the two or more emotion representation contents based on an input frequency and an input order.

18. The method of claim 17, the presenting of the another preview representation comprises:

applying a first partial motion of the another animation to the main content; and applying a second partial motion of the another animation to the sub-content.

19. The method of claim 11, wherein each of emotions of the first emotion representation content and the second emotion representation content is one of a positive emotion, a negative emotion, and a neutral emotion, and wherein the emotion combination the first emotion representation content and the second emotion representation content is one of a positive emotion, a negative emotion, and a neutral emotion, or a combination of two or more thereof.

20. A non-transitory computer-readable storage medium storing instructions that, when executed by a processor of an electronic device, cause the electronic device to:

display, through the display, a text input field in a messaging service application;

in response to a first user input for selecting a first emotion representation content from a plurality of emotion representation contents, present the first emotion representation content in the text input field;

in response to a second user input for selecting a second emotion representation content from the plurality of emotion representation contents, generate an animation corresponding to an emotion combination of the first emotion representation content and the second emotion representation content, and present the second emotion representation content in the text input field and a preview representation of the generated animation; and based on selecting the preview representation, output the generated animation corresponding to the emotion combination of the first emotion representation content and the second emotion representation content.

* * * * *